United States Patent
Bouyarmane

(10) Patent No.: US 11,734,242 B1
(45) Date of Patent: Aug. 22, 2023

(54) ARCHITECTURE FOR RESOLUTION OF INCONSISTENT ITEM IDENTIFIERS IN A GLOBAL CATALOG

(71) Applicant: Amazon Technologies, Inc., Seattle, WA (US)

(72) Inventor: Karim Bouyarmane, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

(21) Appl. No.: 17/219,329

(22) Filed: Mar. 31, 2021

(51) Int. Cl.
*G06F 16/00* (2019.01)
*G06F 16/22* (2019.01)
(Continued)

(52) U.S. Cl.
CPC .......... *G06F 16/2228* (2019.01); *G06F 16/14* (2019.01); *G06F 16/2438* (2019.01);
(Continued)

(58) Field of Classification Search
CPC ...... G06F 16/228; G06F 16/14; G06F 16/285; G06F 16/73; G06F 16/90328; G06F 16/29; G06F 16/3329; G06F 16/383; G06F 16/38; G06F 16/483; G06Q 30/0603; G06Q 30/0201; G06Q 30/0629; G06Q 30/02; G06Q 30/0623; G06Q 30/0255
See application file for complete search history.

(56) References Cited

U.S. PATENT DOCUMENTS 7,412,429 B1 * 8/2008 Syeda-Mahmood ........................ G06K 9/6273
706/45
7,773,806 B2 * 8/2010 Cremers ................. G06T 7/143
382/164

(Continued)

FOREIGN PATENT DOCUMENTS

| WO | WO2005057363 A2 * | 6/2005 |
| WO | WO2010090724 A1 * | 8/2010 |
| WO | WO2016087589 A1 * | 6/2016 |

OTHER PUBLICATIONS

Jason Ingyu Choi et al., "Semantic Product Search for Matching Structured Product Catalogs in E-Commerce", Information Retrieval, Aug. 18, 2020, pp. 1-4.*

(Continued)

*Primary Examiner* — Srirama Channavajjala
(74) *Attorney, Agent, or Firm* — Knobbe, Martens, Olson & Bear, LLP

(57) ABSTRACT

Systems and methods are provided for using language-agnostic embedding data to analyze a plurality of items associated with an item identifier in a catalog and determine a characteristic associated with the plurality of items or the item identifier. A distribution may be generated based on the language-agnostic embedding data and groups of items may be identified based on the distribution. Based on the groups of items, the item identifier may be classified as a consistent item identifier or an inconsistent item identifier across the catalog. A primary group of items and secondary groups of (Continued)

items can be identified for the plurality of items. The primary group of items may include items with a verified association with the item identifier and the secondary groups of items may include items with an unverified association with the item identifier.

21 Claims, 11 Drawing Sheets

(51) Int. Cl.
    *G06F 16/29* (2019.01)
    *G06Q 30/0601* (2023.01)
    *G06F 16/14* (2019.01)
    *G06F 16/242* (2019.01)
    *G06F 16/35* (2019.01)
    *G06F 16/51* (2019.01)

(52) U.S. Cl.
    CPC .............. *G06F 16/29* (2019.01); *G06F 16/35* (2019.01); *G06F 16/51* (2019.01); *G06Q 30/0631* (2013.01)

(56) References Cited

U.S. PATENT DOCUMENTS

| | | | | |
|---|---|---|---|---|
| 7,908,176 B1* | 3/2011 | Hill | .................... | G06Q 30/0629 705/37 |
| 2002/0184111 A1* | 12/2002 | Swanson | ............ | G06Q 30/0603 705/26.5 |
| 2013/0085804 A1* | 4/2013 | Left | .................... | G06Q 30/0201 705/7.29 |
| 2015/0112801 A1* | 4/2015 | Nice | .................... | G06Q 30/0255 705/14.53 |
| 2016/0042251 A1* | 2/2016 | Cordova-Diba | ........ | G06F 16/73 382/199 |
| 2017/0206536 A1 | 7/2017 | Brelig et al. | | |
| 2019/0108532 A1* | 4/2019 | Lakshminarayanan | ...................... | G06Q 30/02 |
| 2020/0396237 A1* | 12/2020 | Cohen | .................... | G06F 16/285 |
| 2021/0233149 A1* | 7/2021 | Korpeoglu | ........ | G06F 16/90328 |
| 2021/0312531 A1* | 10/2021 | Mcginnis | ........... | G06Q 30/0623 |

OTHER PUBLICATIONS

Sunita Guru et al., "Ranking of perceived risks in online shopping", Decision (Jun. 2020) 47(2):Published online: Indian Institute of Management, Apr. 25, 2020, pp. 137-152.*

Debopriyo Banerjee et al., "BOXREC: Recommending a Box of Preferred Outfits in Online Shopping ", ACM Transactions on Intelligent Systems and Technology, vol. 11, No. 6, Article 69. Publication date: Sep. 2020, pp. 1-28.*

Cohen et al., "A Comparison of String Metrics for Matching Names and Records," In Kdd workshop on data cleaning and object consolidation, 2003, vol. 3. 73-78.

Cohen et al., "A Comparison of String Distance Metrics for Name-Matching Tasks," https://www.cs.cmu.edu/~wcohen/postscript/ijcai-ws-2003.pdf, downloaded Mar. 22, 2023, 6 pages.

Elmagarmid et al. "Duplicate Record Detection: A Survey," IEEE Transactions on knowledge and data engineering 19, 1 (2006), 1-16.

Firat et al., "Multi-Way, Multilingual Neural Machine Translation with a Shared Attention Mechanism," arXiv preprint arXiv:1601.01073 (2016).

Kopcke et al., "Tailoring entity resolution for matching product offers," In Proceedings of the 15th International Conference on Extending Database Technology, 2012, p. 545-550.

* cited by examiner

US 11,734,242 B1

ARCHITECTURE FOR RESOLUTION OF INCONSISTENT ITEM IDENTIFIERS IN A GLOBAL CATALOG

BACKGROUND

Retailers and merchants involved in electronic commerce often provide user interfaces from which a user may search or browse an electronic catalog for products or other items available for purchase. A given retailer may obtain its inventory of products or other items that it offers for sale to consumers from a potentially large number of different manufacturers, suppliers, distributors, and/or resellers. Manufacturers and/or other item providers may assign an identification number or other identifier to each of the given manufacturer's products. For example, an Original Equipment Manufacturer ("OEM") may assign, to each of its items, a stock-keeping unit ("SKU"), a Universal Product Code ("UPC"), an International or European Article Number ("EAN"), a model number, and/or other types of identification numbers or alphanumeric strings. In a catalog of items, multiple manufacturers may assign the same item identification number to different items. For example, a first manufacturer may assign the item identification number to a first item and a second manufacturer may assign the item identification number to a second item. The assignment of the same item identification number to different items may relate to, for example, the language associated with the item, the geography associated with the item, or other differences between geographic regions. In many instances, in a catalog, manufacturers, retailers, and/or other parties may assign the same item identification number to items with substantial variations.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
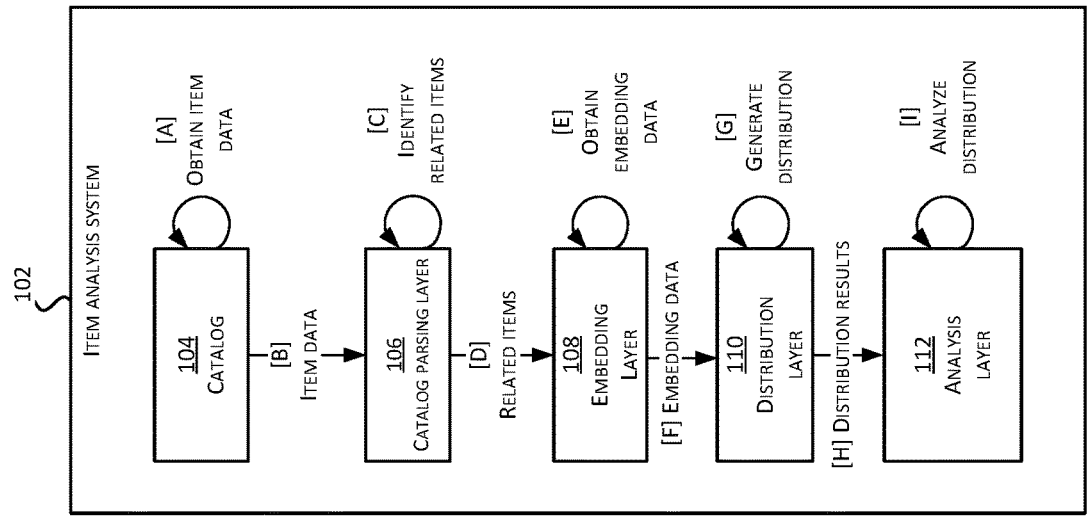
FIG. 1 depicts a schematic diagram of a natural language processing system, including a catalog parsing layer, an embedding layer, a distribution layer, and an analysis layer in accordance with aspects of the present disclosure.

The present disclosure generally relates to analyzing item information of items listed for sale to identify items that share an item identifier despite the items having some substantial (e.g., egregious, confusing, misleading, etc.) differences in their item information. For example, the items may be listed for acquisition (e.g., sale, rent, donation, etc.) in multiple geographies (e.g., each geography corresponding to a different country or geographic region). In another example, the items may be listed for acquisition in the same geography. Users, via user computing devices, may interact with an electronic catalog to purchase, sell, etc. items. User computing devices may interface with an electronic retail system that provides the catalog and maintains item information for the items. The catalog may be a metadata catalog storing metadata associated with a plurality of items. The catalog may further store metadata associated with a plurality of items and a plurality of languages. For example, the catalog may store metadata associated with a plurality of items sharing an item identifier and each corresponding to a different language. In some embodiments, the catalog may include multiple geographies distributed across multiple countries or geographic regions. Further, the multiple geographies may each be associated with multiple languages. In other embodiments, the catalog may be a global catalog. The item information may include an item identifier (e.g., a unique item identification number) that identifies a particular item. The item identifier may be associated with a particular item or type of item (e.g., an Acme brand television). Some items, in the same geography or in multiple geographies, may share the same item identifier (e.g., the same item may be listed in separate, distinct geographies and to increase the efficiency of the retail system, the items may be associated with the same item identifier). Based on the item identifier associated with the item, particular information may be associated with (e.g., displayed for) a particular item. For example, the image displayed for the item, the item details (e.g., the brand, the manufacturer, etc.), the ratings, the reviews, or other item details may be associated with a particular item based on the item identifier associated with the item. As multiple items may share the same item identifier, the same item details may be associated with multiple items. This association of the same item details with multiple items (which is both appropriate and necessary for numerous reasons) presents a technical problem when diverse or dissimilar items are associated with the same item identifier. For example, a first item (e.g., a television) and a second item (e.g., a shirt) may share the same item identifier and item details associated with one of the first item or the second item may be displayed for both items. This technical problem is generally resolved, as noted above, by requiring the retail system to utilize pairwise matching models to compare each pair of items that share the same item identifier. Utilizing pairwise matching models may be ineffective and/or inefficient as the number of items that share an item identifier increases. For example, for a group of six items that share an item identifier, the retail system may compare 21 possible pairwise matches between the six items as each of the six items may be compared with each other item. However, the number of pairwise distance comparisons that must be made in this approach scales linearly as the number of items increases, and the items available in any given geography may number in the tens of billions. The time and computing resources required to perform such pairwise comparisons may thus be significant or prohibitive.

However, this technical problem may be resolved by the item analysis system without requiring the use of the foregoing, without requiring multiple resolutions, without requiring translation, and without requiring the use of supervised learning data. More specifically, using the item analysis system of the present disclosure, (1) the retail system can solve each item identifier collectively across multiple geographies that include the item associated with the item identifier; (2) the retail system can model embeddings of the items as distributions in order to detect inconsistent items (e.g., items that are inconsistent with a determined item identity of the item identifier); (3) the retail system can utilize an unsupervised learning approach to detect the inconsistent items; (4) the retail system can scale the item analysis system across languages and across geographies; and (5) the retail system can consider the possible combinations of geographies. The embeddings may include language-agnostic embeddings. The distributions may be a distribution of the embeddings of the items associated with the same item identifier. By conducting an item analysis in this manner, the computing resources needed to process a large catalog of items and to process requests for items within such a large catalog are both thereby reduced.

Additional technical problems may also be addressed by the item analysis system of the present disclosure. For example, as a seller seeks to sell an item via the retail system, the seller can suggest an item identifier to be associated with the item and the retail system can analyze the item identifier. A seller may suggest, for an item, an item identifier that is associated with other items. In some embodiments, the item may be related to the other items associated with the item identifier. In other embodiments, the item may not be related to the other items associated with the item identifier. For example, the other items may be popular items and the seller may desire to benefit from the popularity of the popular items by using the same item identifier for an item that is unrelated to the other items. Further, a seller may wish to link an item (e.g., a new item or an unpopular item such as a particularly unpopular welding paste) with an item identifier associated with other items (e.g., popular items such as a popular television). In some embodiments, the use of the item identifier may enable item details (e.g., reviews, ratings) that are associated with the popularity of the item to be shared between items that share the item identifier. Such a use of the item identifier can create a defect in the catalog of the retail system that may go undetected and may have a significant customer impact. In accordance with the present disclosure, the retail system can determine whether the item is consistent with items that share the same item identifier in the catalog (e.g., items in multiple geographies). For example, the retail system can determine an item identity to be associated with the item identifier and identify a relationship between the item and the item identifier (e.g., determine whether the item is consistent with a determined item identity of the item identifier). Based on the analysis of the item identifier and the relationship between the item and the item identifier, the retail system can cause display of a user interface that includes a response and automatically reject the suggested item identifier for the item or accept the suggested item identifier for the item. The retail system can cause display of the user interface that includes the response indicating whether the item identifier has been rejected or accepted. Based on determining the item is inconsistent with the determined item identity associated with the item identifier, the retail system can, via the user interface, provide a response to propose a new item identifier for the item, propose a current item identifier for the item (e.g., a currently utilized item identifier), or request the seller to a suggest a new item identifier for the item. Therefore, the item analysis system can prevent such a use of the item identifier by verifying, when an item identifier is proposed for an item, that the item is consistent with the determined item identity associated with the same item identifier. Thus, the customer need not be concerned about item details being shared between non-related items.

Further, the item analysis system provides for efficient monitoring, identification, and resolution of inconsistent item identifiers (e.g., item identifiers that are associated with multiple different item identities) of the catalog to the retail system on demand, rather than requiring the retail system to resolve inconsistent item identifiers in a piecemeal approach. For example, the resolution of inconsistent item identifiers may be beneficial when a first item in a first geography is associated with the item identifier and is a hazmat and a second item in a second geography is associated with the item identifier and is not a hazmat. Further, this may be beneficial to avoid highly inconsistent offers (e.g., a laptop priced at the price of a shampoo bottle). A traditional retail system may identify and resolve inconsistent item identifiers using n squared passes through the catalog where n is the number of geographies associated with the catalog. As the number of geographies may be large and may vary over time, resolving inconsistent item identifiers may be costly and time consuming. Therefore, a traditional retail system may perform limited monitoring of the item identifiers. The item analysis system may improve on this process by enabling the monitoring, identification, and resolution of inconsistent item identifiers in a scalable manner via a single pass through the catalog (e.g., the plurality of geographies). Moreover, the item analysis system may enable a single collective resolution and may determine, in one pass through, a determined item identity for the item identifier and each defective and/or inconsistent item (e.g., an item not associated with the determined item identity) associated with the item identifier. Because the item analysis system is capable of identifying inconsistent items in a single pass through, the item analysis system provides consumers with greater security and an improved shopping experience. In addition, the computing resources needed to process the catalog of items and to process requests for items within such a catalog are both thereby reduced.

As noted above, using the item analysis system, the retail system can detect and resolve inconsistent items associated with the same item identifier. The retail system can obtain embedding data associated with the items that are linked to the same item identifier. The retail system may obtain the embedding data using language-agnostic embeddings. For example, the language-agnostic embeddings may be a language-agnostic sentence embedding, a language-agnostic text embedding, a language-agnostic word embedding, a language-agnostic phrase embedding, or any type of language-agnostic embedding. A language-agnostic embedding can be any model (e.g., module, tool, etc.) for encoding (e.g., modelling, mapping, etc.) sets of text data associated with a plurality of languages into a shared embedding space to generate the embedding data. For example, a first set of text data in English, a second set of text data in Spanish, and a third set of text data in Mandarin can be encoded into the same shared embedding space. Further, the sets of text data associated with the plurality of languages can be encoded into the shared embedding space without language translation. Further, the retail system can model the embedding data as a sample from a distribution (e.g., a Von Mises-Fisher distribution). The retail system may model each item identifier as a distribution and the catalog as a distribution of the distributions. The retail system can then detect the outliers in the distribution of the distributions. In order to identify the outliers in the distribution, the retail system can utilize data analysis of the distribution. For example, the data analysis can include utilizing a community detection algorithm, a clustering algorithm, an optimization algorithm, or any other type of data analysis. For example, the retail system can identify outliers with a Mean Shift algorithm, Density-Based Spatial Clustering of Applications with Noise ("DBSCAN"), a Cosine-Similarity algorithm, or any other type of data analysis. Based on the results of the clustering algorithm, the retail system can detect and resolve inconsistent items associated with the same item identifier.

The term "item" is used herein to any good, product or service, whether physical or digital, that can be made available for redemption, purchase or other acquisition electronically or via the Internet. As used herein, the term "item," in addition to having its ordinary meaning, is used interchangeably to refer to an item itself (e.g., a particular product) and to its description or representation in a computer system, such as in an electronic catalog. As will be apparent from the context in which it is used, the term is also sometimes used herein to refer only to the item itself or only to its representation in the computer system.

FIG. 1 illustrates an example environment 100 in which an item analysis system 102 may be implemented according to some embodiments. The item analysis system 102 may be implemented based on a prompt or some other interrupt-driven event. For example, the item analysis system 102 may be implemented based on receiving a user request, via a user computing device, to associate an item identifier with a particular embodiment. In some embodiments, the item analysis system 102 may be automatically implemented to periodically (or aperiodically) manage the items and item identifiers associated with a catalog. For example, the item analysis system 102 may be implemented to periodically manage the items that are associated with a particular item identifier.

The item analysis system 102 may include various components for providing the features described herein. In some embodiments, the item analysis system 102 may include a catalog 104 to store items and item data associated with the items (e.g., item identifiers). The catalog may store items for a plurality of geographies. Each geography may correspond to a particular location (e.g., a Sweden geography, an Italian geography, a Canadian geography). Geographies may further correspond to particular regions that can be delineated based on various factors (e.g., southeastern United States, South Carolina, Columbia, South Carolina, etc.). The catalog 104 may be a catalog for all geographies globally (e.g., a catalog for all geographies located across the globe). In some embodiments, the catalog 104 may be catalog for a plurality of geographies (e.g., a catalog for geographies in Canada and Sweden). In other embodiments, the catalog 104 may be a catalog for a singular geography (e.g., a Canadian geography). In some embodiments, the catalog 104 may be a combination of catalogs for a plurality of geographies (e.g., a catalog for a Canadian geography, a catalog for a Sweden geography, etc.). The catalog 104 may provide the item data to a catalog parsing layer 106 (e.g., the catalog 104 may identify the items and associated item identifiers for each item). The catalog parsing layer 106 may parse the items to identify items related to a particular item identifier. In some embodiments, the catalog parsing layer 106 may identify a plurality of item identifiers associated with the catalog.

The item analysis system 102 may further include an embedding layer 108 to obtain embedding data based at least in part on the item data. The embedding data represents the item data or portions thereof in view of particular semantics. The embedding layer 108 may process the item data and any provided semantic data associated with the item data to generate a vector representation of each portion of the item data. The distribution layer 110 may process the embedding data and generate a distribution of the item data. The item analysis system 102 may also include an analysis layer 112 to analyze the distribution of the item data, such as by analyzing clusters of the distribution of the item data. The item analysis system 102 may utilize the analysis layer 112 to determine a primary cluster associated with the distribution of the item data (e.g., a determined item identity for the item identifier). The analysis layer 112 may respond to determined item data by determining one or more characteristics of the item data or an item identifier. For example, the analysis layer 112 may determine that a particular item identifier is consistent with a determined item identity (e.g., each item associated with the item identifier is associated with the same item identity) or inconsistent with a determined item identity (e.g., one or more items associated with the item identifier are associated with multiple different item identities). The example subsystems and components of the item analysis system 102 shown in FIG. 1 are illustrative only, and are not intended to be limiting. In some embodiments, an item analysis system 102 may have fewer, additional, and/or alternative components and data stores.

The item analysis system 102 may be implemented on one or more physical server computing devices that provide computing services and resources to end-user devices. In some embodiments, the item analysis system 102 (or individual components thereof) may be implemented on one or more host devices, such as blade servers, midrange computing devices, mainframe computers, desktop computers, or any other computing device configured to provide computing services and resources. For example, a single host device may execute one or more of the catalog parsing layer 106, the embedding layer 108, the distribution layer 110, the analysis layer 112, some combination thereof, etc. The item analysis system 102 may include any number of such hosts.

In some embodiments, the features and services provided by the item analysis system 102 may be implemented as a web service consumable via one or more communication networks. In further embodiments, the item analysis system 102 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

At [A] of FIG. 1, the catalog 104 can obtain the item data for a plurality of items that are associated with the catalog.

The catalog 104 can obtain the item data in response to a prompt, question, query, etc. from a retailer requesting that an item be associated with a particular item identifier. The catalog 104 may obtain the item data in order to determine items that are associated with the particular item identifier. In some embodiments, the catalog 104 can obtain the item data, periodically or aperiodically, in order to monitor the items associated with each item identifier. The catalog 104 may obtain the item data from a local or remote data store. In other embodiments, the catalog 104 can periodically obtain the item data.

At [B], the catalog parsing layer 106 can receive the item data from the catalog 104 in order to determine items that are related or associated with the item identifier identified by the retailer's query. In some embodiments, the catalog parsing layer 106 can receive the item data in order to determine items that are associated with the same item identifier. The item data may be associated with a plurality of items associated with the catalog. For example, the item data may be data for items being sold via the catalog. The catalog 104 may send the item data of the items associated with the catalog. For example, the item data may correspond to a plurality of items and/or a plurality of item identifiers. The catalog parsing layer 106 can send the item data as a data signal to the catalog parsing layer via a network. In some embodiments, the catalog 104 may not provide item data to the catalog parsing layer 106. Further, the catalog parsing layer 106 may parse the catalog 104 to identify the item data.

At [C], the catalog parsing layer 106 can identify related items using the item data received at [B] in order to identify items that are associated with the same item identifier (e.g., the item identifier identified by the query of the retailer). Illustratively, the item data may include a particular item and item details (e.g., an item identifier). By identifying related items that share an item identifier, the catalog parsing layer 106 can reduce the number of items that require further processing. The catalog parsing layer 106 may identify one or more items based on the item data to identify items that share an item identifier. Further, the catalog parsing layer 106 may identify one or more groups of items and each group of items may correspond to a particular item identifier. In some examples, the catalog parsing layer 106 may identify related items in a plurality of geographies. For example, the related items may include a first item for sale in an Australian geography and a second item for sale in a Chinese geography. Thus, each item of the related items may correspond to a particular geography. The catalog parsing layer 106 may provide the item data associated with the related items to the embedding layer 108 at [D].

At [E], the embedding layer 108 can obtain embedding data using the item data associated with the related items, received at [D] in order to map the item data into the same embedding space. As the catalog can be associated with a plurality of geographies and a plurality of languages, the embedding layer maps the item data into a shared embedding space. Further, the mapping of the item data into a shared embedding space can normalize the format of the item data (e.g., to form embedding data) without the use of language translation. Illustratively, to obtain the embedding data, the item data may be appended (e.g., concatenated) together before being provided to the embedding layer 108. For example, for a given item "Acme Lawn Mower" that is associated with given item data (e.g., style, color, etc.), the embedding layer 108 may receive an input vector "<Lawn Mower, Riding, Red>". In some implementations, obtaining the embedding data may include generating or otherwise determining one or more embedding values for an input vector. The item data may be appended, concatenated, or combined via other methods to combine the dataset and may be combined into a form other than an input vector. The embedding layer 108 may obtain embedding data for each input vector. In response to receiving the input vector, the embedding layer 108 may generate embedding data (e.g., a matrix or vector of numbers). As all item data corresponding to the item identifier may be embedded, the item data may be mapped to a common format. The embedding data for a particular item (e.g., a particular subset of item data) may be obtained using word or sentence embedding that generates the embedding data. For example, the embedding layer 108 may represent a corresponding word or sentence in a numerical manner. In some embodiments, the embedding data may be language-agnostic embedding data in order to enable the mapping of item data (text) to embedding data (a numerical vector or matrix) without requiring language translation. At [F], the embedding layer 108 provides the embedding data for the related items to the distribution layer 110.

At [G], the embedding data generated by the embedding layer 108 may be provided to the distribution layer 110 in order to determine a distribution of the embedding data for the related items. By determining the distribution of the embedding data, the embedding layer 108 can identify groups of items in order to determine an item identity for the item identifier and a primary group of items that are associated with the item identity (e.g., items that are correctly associated with the item identifier). Further, by determining the distribution of the embedding data, the embedding layer 108 can identify false item identities that are incorrectly associated with the item identifier and secondary groups of items that are associated with the false item identities (e.g., items that are incorrectly associated with the item identifier). The distribution layer 110 may be able to determine the distribution of the embedding data as the embedding data identifies the items in a common format (e.g., a numerical vector). The distribution layer 110 can model the embedding data with a distribution. For example, the distribution layer 110 can model the embedding data with a von Mises-Fisher distribution. The von Mises-Fisher distribution is a probability distribution that can map data onto a multi-dimensional hypersphere in a multi-dimensional embedding space. The von Mises-Fisher distribution can distribute the embedding data cross the multi-dimensional hypersphere. Items that have a higher probability of being related (e.g., being associated with the same item identity) may be grouped closer together on the multi-dimensional hypersphere. Items that have a lower probability of being related (e.g., being associated with the same item identity) may be located further apart on the multi-dimensional hypersphere. By modeling the embedding data in this manner, groups of items can be identified based on the distribution (each group of items corresponding to a particular item identity). The embedding data may include subgroups of embedding data and each subgroup of embedding data may correspond to iterations of the item identifier in a particular geography. For example, a first subgroup may correspond to items associated with the item identifier in a first geography and a second subgroup may correspond to items associated with the item identifier in a second geography. Each subgroup of embedding data may be modelled as an independent, identically distributed sample from the distribution results. At [H], the distribution layer 110 provides the distribution results (e.g., the distribution of the embedding data across the multi-dimensional hypersphere) to the analysis layer 112.

At [I], the analysis layer 112 may obtain the distribution results from the distribution layer 110. Based on the distribution results, the analysis layer 112 can analyze the distribution in order to determine one or more characteristics associated with the item identifier and/or the related items. The analysis layer 112 can apply data analysis (e.g., one or more algorithms) to the distribution to identify one or more groups of items of the distribution (each group of items associated with a particular item identity. For example, the data analysis can include application of one or more clustering algorithms such as a Mean Shift algorithm, DBSCAN, a Cosine-Similarity algorithm, or any other clustering algorithm. Based on the one or more groups of items of the distribution, the analysis layer 112 can determine whether the item identifier proposed by the retailer is associated with a singular group of items or item identity (e.g., the item identifier is a consistent item identifier where all items associated with the item identifier are associated with the same item identity) or multiple groups of items or item identities (e.g., the item identifier is an inconsistent item identifier where items associated with the item identifier are associated with multiple item identities). For example, a consistent item identifier may correspond to an item identifier where the related items are consistent and refer to the same item and/or type of item and an inconsistent item identifier may correspond to an item identifier where the related items are inconsistent and refer to different items and/or item type. Further, the analysis layer 112 can determine a primary group of items or a primary item identity for the item identifier from the groups of items associated with the item identifier. The primary item identity may be based on the group of items of the groups of items that contains the most items. In some embodiments, the primary item identity may be based on other factors. For example, the primary item identity may be predefined and obtained from a user. For example, a primary group of items may correspond to items that are correctly related to the item identifier and secondary groups of items may correspond to items that are incorrectly related to the item identifier. The analysis layer 112 can then determine if the item proposed by the retailer is associated with the primary group of items and, if it is associated with the primary group of items, may correlate the item and the item identifier (e.g., may accept the retailer's request). If the item is not associated with the primary group of items, the analysis layer 112 can deny the retailer's request. In some embodiments, the analysis layer 112 can disassociate items from the secondary groups of items and the item identifier. Further, the analysis layer 112 may obtain, generate, or identify a new item identifier for each item of the secondary groups of items. In some embodiments, the analysis layer 112 may provide the results of the analysis of the distribution to a user, a retailer, the retail system, etc.

Figure 2:
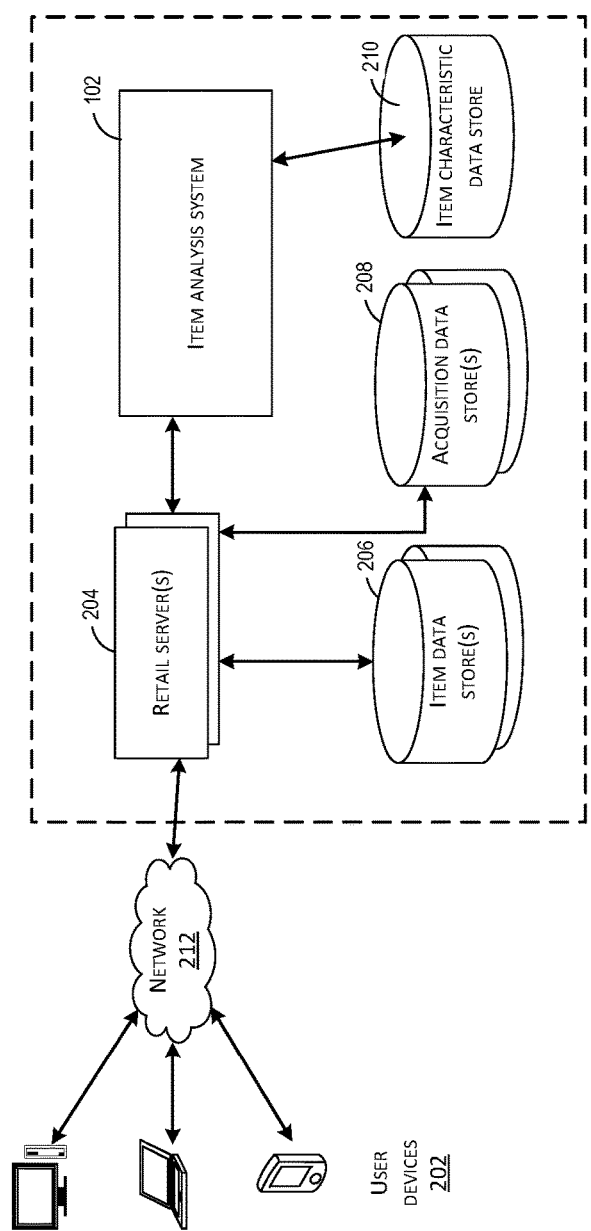
FIG. 2 is a block diagram depicting an illustrative operating environment for identifying items that share an item identifier and determining a characteristic of the item identifier.

FIG. 2 is a block diagram depicting an illustrative operating environment 200 for identifying items that share an item identifier, and determining whether the items are consistent or inconsistent. The illustrative operating environment shown in FIG. 2 includes an electronic catalog system 200 that enables users to browse items, such as items listed in an electronic catalog for purchase. The catalog system 200 may include an item analysis system 102, as well as an item characteristic data store 210, which may be used to implement various aspects of the present disclosure, such as using the item analysis system 102 to analyze items associated with an item identifier to identify inconsistent items. The item analysis system 102 may not require training such that the item analysis system can be implemented for different, diverse retail server(s) 204 without requiring the item analysis system 102 to be retrained. Further, the item analysis system 102 may be a plug-and-play item analysis system 102. The item characteristic data store 210 may store the characteristic of the items (e.g., whether an item is consistent or inconsistent).

The catalog system 200 may also include one or more retail servers 204 that facilitate electronic browsing and purchasing of items using various user devices, such as user computing devices 202 (which may alternatively be referred to herein as client computing devices). While a single retail server operated by a single retail entity will often be used herein for illustrative purposes, it will be appreciated that multiple retail servers operated by different retail entities, potentially in different countries, may provide item attribute information to the item analysis system 102, in some embodiments, and may each have their own item data store and/or acquisition data store. User computing devices 202 may be any of a number of computing devices that are capable of communicating over a network including, but not limited to, a laptop, personal computer, personal digital assistant (PDA), hybrid PDA/mobile phone, mobile phone, smartphone, electronic book reader, digital media player, tablet computer, gaming console or controller, kiosk, augmented reality device, other wireless device, set-top or other television box, and the like.

Retail server 204 may be connected to and/or in communication with an item data store 206 that stores item information regarding a number of items, such as items listed in an electronic catalog as available for browsing and/or purchasing via the retail server 204. Item data stored in item data store 206 may include any information related to each item (e.g., item details or item data). For example, item data may include, but is not limited to, price, availability, item images, item description, item attributes, item text, item reviews, etc. The item data store 206 may additionally store digital content items (e.g., audiobooks, electronic books, music, movies, multimedia works, etc.). The retail server 204 may also be connected to or in communication with acquisition data store 208, which may store acquisition and/or sale terms associated with items listed in an electronic catalog. For example, acquisition information may include acquisition terms for the retailer to obtain inventory of a given item in a given geography. These terms may include an inventory acquisition price or wholesale price, a distributor or other source of the item, and/or various contractual or financial terms associated with the acquisition of inventory for a given item in a given country or other geographic region.

The item data store 206 may store item attribute information for each of a potentially large number of different items. It will be appreciated that some item attributes may be specific to a given item type. Item attributes for a book, for example, may include book title, author, publisher, and page count, while item attributes for an item of clothing may include size, color, designer, gender, etc. Stored item attribute data, in some embodiments, may include both item attributes and item attribute values. Example item attributes for a given item, such as a running shoe, may include "Title," "Color," "Size," "Fabric Type," "Brand Name," "Sole Type," etc. An item attribute value is a value associated with a given item attribute. For example, the "Fabric Type" item attribute for a given item, such as running shoes, may have an associated item attribute value of "leather." In some embodiments, the electronic catalog may include the same set of attributes for all items, or for all items in a given item category, but for a given item may only include associated item attribute values for a subset of the item attributes. For example, an item attribute of "Sole Type" may be stored for both a running shoes item and a wristwatch item, but there may be no associated item attribute value stored for the wristwatch item, because, for example, the "Sole Type" attribute is not relevant to a wristwatch. In other embodiments, an item attribute for a given item may only be included in the electronic catalog if an associated item attribute value is also included.

In some embodiments, each of the item data store 206, acquisition data store 208 and/or item characteristic data store 210 may be local to the associated retail server 204, may be remote from both item analysis system 102 and retail server 204, and/or may be a network-based service itself. The illustrated data stores may be embodied in hard disk drives, solid state memories, any other type of non-transitory computer-readable storage medium, and/or a file, a database, a relational database, in-memory cache, and/or stored in any such non-transitory computer-readable medium accessible to the retail server 204 and/or item analysis system 102. The data stores may also be distributed or partitioned across multiple local and/or storage devices, or combined into a single storage device, without departing from the spirit and scope of the present disclosure. In some embodiments, seller computing devices (not shown in FIG. 2) may be in communication with the item analysis system 102, directly or indirectly. For example, the seller computing devices may communicate with the item analysis system 102 to request the association of a particular item with a particular item identifier.

In the environment shown in FIG. 2, a user of the catalog system 200 may utilize a user computing device 202 to communicate with the retail server 204 via a communication network 212, such as the Internet or other communications link. The network 212 may be any wired network, wireless network or combination thereof. In addition, the network 212 may be a personal area network, local area network, wide area network, cable network, satellite network, cellular telephone network, etc. or combination thereof. For example, the network 212 may be a publicly accessible network of linked networks, possibly operated by various distinct parties, such as the Internet. In some embodiments, the network 212 may be a private or semi-private network, such as a corporate or university intranet. The network 212 may include one or more wireless networks, such as a Global System for Mobile Communications (GSM) network, a Code Division Multiple Access (CDMA) network, a Long Term Evolution (LTE) network, or some other type of wireless network. The network 212 may use protocols and components for communicating via the Internet or any of the other aforementioned types of networks.

The catalog system 200 is depicted in FIG. 2 as operating in a distributed computing environment including several computer systems that are interconnected using one or more computer networks. The catalog system 200 could also operate within a computing environment having a fewer or greater number of devices than are illustrated in FIG. 2. Thus, the depiction of catalog system 200 in FIG. 2 should be taken as illustrative and not limiting to the present disclosure. For example, the catalog system 200 could implement various Web services components and/or peer-to-peer network configurations to implement at least a portion of the processes described herein.

In brief, the retail server 204 is generally responsible for providing front-end communication with various user devices, such as a user computing device 202, via the network 212. The front-end communication provided by the retail server 204 may include generating text and/or graphics, possibly organized as a user interface using hypertext transfer or other protocols in response to information inquiries received from the various user devices. The retail server 204 may obtain information on available items from one or more data stores, such as item data store 206, as is done in conventional electronic commerce systems. In certain embodiments, the retail server 204 may also access item data from other data sources, either internal or external to catalog system 200. In some embodiments other than that illustrated in FIG. 2, the retail server 204 may include or implement an item analysis service, as described herein, such that a separate item analysis system 102 may not be present in certain embodiments.

Figure 3A:
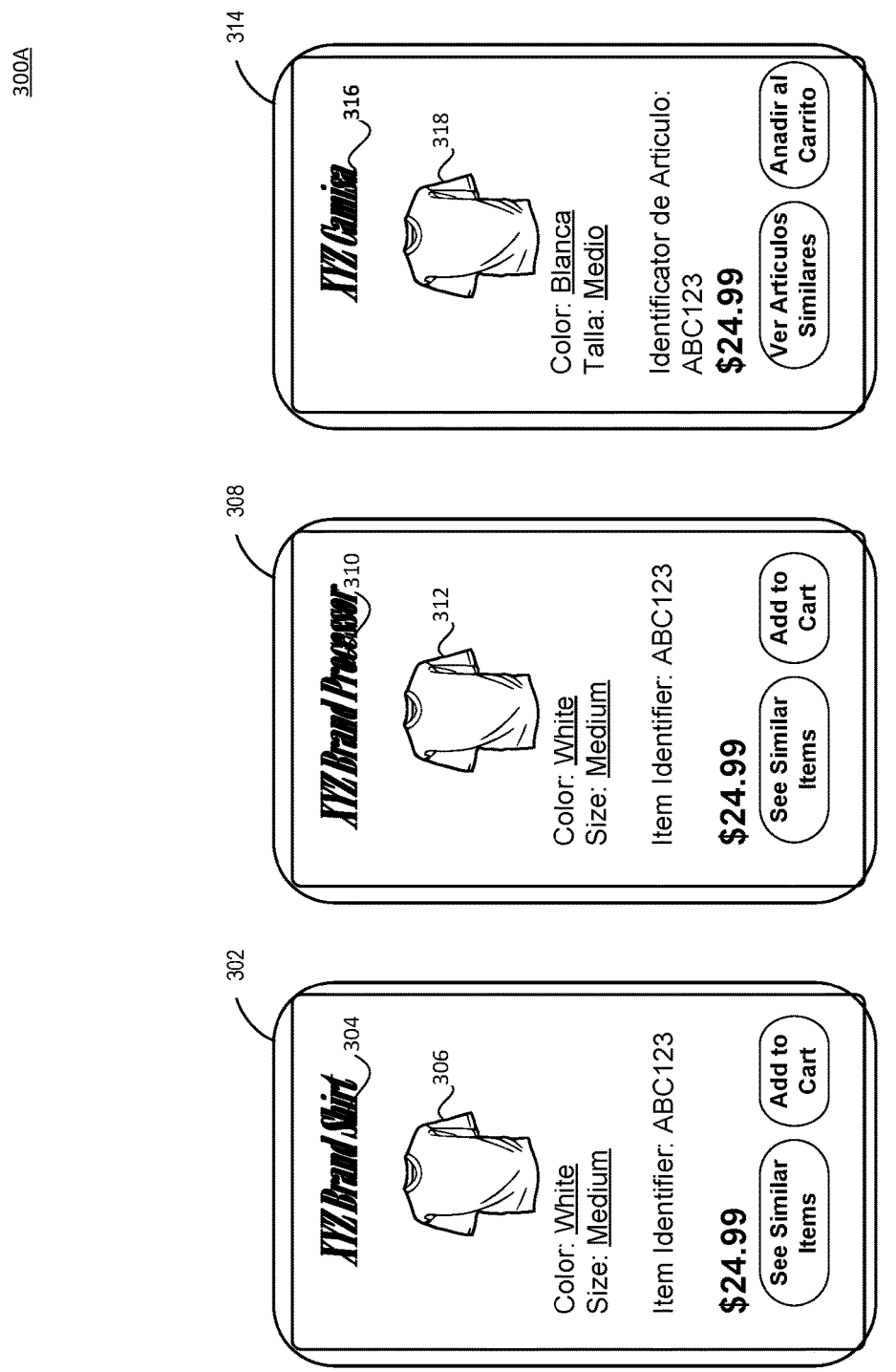
FIG. 3A is a pictorial diagram depicting user interfaces identifying items that share an item identifier.

FIG. 3A depicts a series of example user interfaces 302, 308, and 314 presented on a mobile device (e.g., a user computing device) in order to display particular items for browsing and preview by a customer. The example user interfaces 302, 308, and 314 are illustrative of an interface that the retail server generates and presents to a customer when interacting with the retail server. The example user interfaces 302, 308, and 314 illustrate items that are associated with the same item identifier. For example, the first item, the second item, and the third item are each associated with the item identifier "ABC123." In some embodiments, the user interface may identify the item identifier. In other embodiments, the user interface may not identify the item identifier. Each item and each user interface 302, 308, and 314 may be associated with a different language. For example, the first item and user interface 302 and the second item and user interface 308 may be associated with the English language and the third item and the user interface 314 may be associated with the Spanish language. It will be understood that the items and user interfaces 302, 308, and 314 may be associated with more, less, or different languages. Further, each user interface 302, 308, and 314 may be associated with the same web site, however, each user interface 302, 308, and 314 may be associated with a particular regional version of the website. For example, user interface 302 may be associated with a first region and the English language, user interface 308 may be associated with a second region and the English language, and user interface 314 may be associated with a third region and the Spanish language. As the item identifier may be associated with a plurality of items and a plurality of languages, traditional systems may be incapable of identifying characteristics of the shared item identifier without requiring language translation. It will be understood that FIG. 3A is illustrative only, and a retail server may offer any type or combination of items desired by the customer, such as groceries, clothing, office supplies, training services, etc. In some embodiments, items may include digital items (such as an electronic book or a movie that is deliverable over the Internet for presentation on the user device), physical items (such as to be shipped to the customer upon purchase) or services (such as a service to be provided remotely or in person to the customer). The example user interfaces 302, 308, and 314 may be presented to a customer in order to provide access to item information managed by a retail server that may be presented in different contexts. The example user interfaces 302, 308, and 314 may be presented in response to, for example, a search query that is input to a user computing device or an input of a URL or URI to the user computing device. In the illustrated example, the example user interfaces 302, 308, and 314 may be presented in response to the input of a search query for "shirts."

The example user interface 302 illustrates a first item that includes an item title 304 and an item picture 306 associated with an item identifier. The example user interface 308 illustrates a second item that includes an item title 310 and an item picture 312 associated with the same item identifier. The example user interface 314 illustrates a third item that includes an item title 316 and an item picture 318 associated with the same item identifier. Based on each of the first item, the second item, and the third item being associated with the same item identifier, particular item details can be associated with each of and shared between the first item, the second item, and the third item. Due to the first item, the second item, and the third item sharing an item identifier and therefore, item details, the item details may be displayed with the items via the user interfaces. For example, each of the first item, the second item, and the third item are displayed with the same item picture 306, 312, and 318, the same color options, the same size options, and the same price. Further, though not shown in FIG. 3A, each of the first item, the second item, and the third item may be displayed with the same ratings, the same reviews, the same instructions (e.g., how-to videos), and/or any other base item information. In some embodiments, the item details may be in different languages. This sharing of item details between the first item, the second item, and the third item can cause issues where the items are associated with different item identities (e.g., different items, different types of items, etc.). Therefore, as each of the first item, the second item, and the third item may be displayed with the same base item information, it may be important to confirm that each of the first item, the second item, and the third item, because they are associated with the same item identifier, are associated with the same item identity as identified by the item analysis system of FIG. 1. Further, the item analysis system may identify a correct item identity that is correctly linked to the item identifier and/or incorrect item identities that are incorrectly linked to the item identifier. It will be understood that items associated with the same item identifier may include more, less, or different base item information.

In the example of FIG. 3A, the second item is not correctly associated with the correct item identity. In order to determine which items are correctly associated with the item identifier (e.g., items that are associated with the correct item identity for the item identifier) and which items are incorrectly associated with the item identifier (e.g., items that are associated with the incorrect item identities for the item identifier), the item analysis system may determine a primary group of items (e.g., a correct item identity) and/or secondary groups of items (e.g., incorrect item identities). In the example of FIG. 3A, the first item includes an item title 304 "XYZ Brand Shirt," the second item includes an item title 310 "XYZ Brand Processor," and the third item includes an item title 316 "XYZ Camisa." The item analysis system may determine that the correct item identity corresponds to an XYZ Brand Shirt and the primary group of items includes the first item and the third item based at least in part on the item title 304, the item title 310, and the item title 316. Further, the correct item identity may be identified based on the number of items included within the primary group of items. The item analysis system may further determine that an incorrect item identity corresponds to an XYZ brand processor and a secondary group of items includes the second item based at least in part on the item title 304, the item title 310, and the item title 316. As the secondary group of items includes less items than the primary group of items, the secondary group of items may be identified as corresponding to a false item identity. Based on this determination, the item analysis system may disassociate the second item with the item identifier. In some embodiments, the item analysis system may associate the second item with a new item identifier.

Figure 3B:
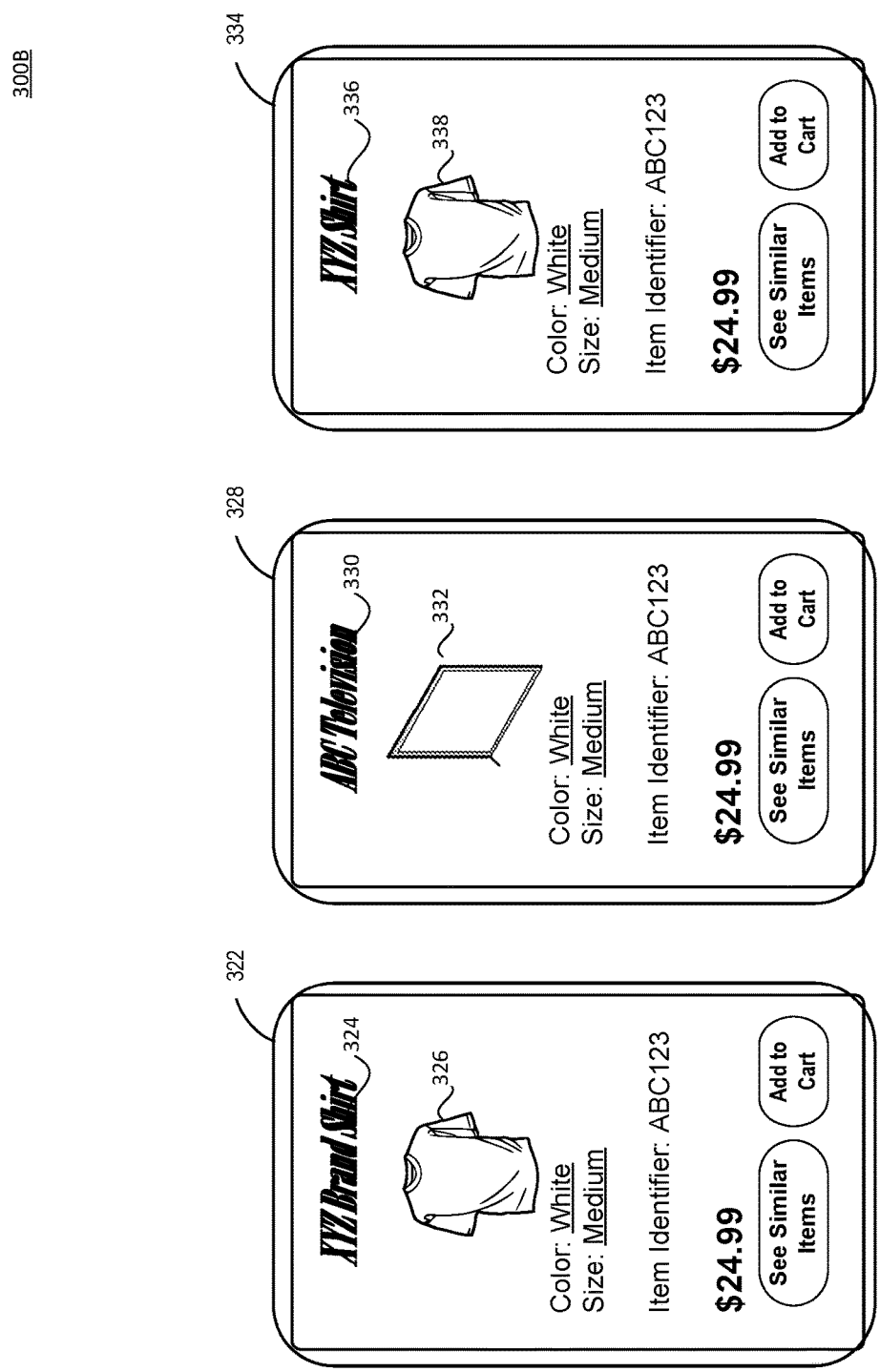
FIG. 3B is a pictorial diagram depicting user interfaces identifying items that share an item identifier.

FIG. 3B depicts a series of example user interfaces 322, 328, and 334 presented on a mobile device (e.g., a user computing device) in order to display particular items for browsing and preview by a customer. The example user interfaces 322, 328, and 334 are illustrative of an interface that the retail server generates and presents to a customer when interacting with the retail server. The example user interfaces 322, 328, and 334 illustrate items that are associated with the same item identifier.

The example user interface 322 illustrates a first item that includes an item title 324 and an item picture 326 associated with an item identifier. The example user interface 328 illustrates a second item that includes an item title 330 and an item picture 332 associated with the same item identifier. The example user interface 334 illustrates a third item that includes an item title 336 and an item picture 338 associated with the same item identifier. For example, the first item, the second item, and the third item are each associated with the item identifier "ABC123." As each of the first item, the second item, and the third item being associated with the same item identifier, particular item details can be associated with each of the first item, the second item, and the third item and displayed with the items via the user interfaces. For example, each of the first item, the second item, and the third item are displayed with the same color options, the same size options, and the same price. Further, though not shown in FIG. 3B, each of the first item, the second item, and the third item may be displayed with the same ratings, the same reviews, the same instructional (e.g., how-to videos), and/or any other base item information. Therefore, as item details may be shared between the first item, the second item, and the third item, it may be crucial to confirm that the first item, the second item, and the third item are correctly associated with the item identifier.

In the example of FIG. 3B, the second item is not correctly associated with the item identifier. In order to determine which items are correctly associated with the item identifier (e.g., associated with a correct item identity for the item identifier) and which items are incorrectly associated with the item identifier (e.g., associated with an incorrect item identity for the item identifier), the item analysis system may determine a primary group of items (e.g., the correct item identity) and/or secondary groups of items (e.g., false item identities). The item analysis system may make this determination in response to a request from a user to associate an item with a particular item identifier, as part of monitoring the catalog, and/or in response to a consumer indication that the item identifier appears to be mismatched to a particular item. In the example of FIG. 3B, the first item includes an item title 324 "XYZ Brand Shirt" and an item picture 326 illustrating a shirt, the second item includes an item title 330 "ABC Television" and an item picture 332 illustrating a television, and the third item includes an item title 336 "XYZ Shirt" and an item picture 338 illustrating a shirt. The item analysis system may determine that the item identity corresponds to an XYZ Brand Shirt and the primary group of items includes the first item and the third item based at least in part on the item title 324, the item picture 326, the item title 330, the item picture 332, the item title 336, and the item picture 338. Further, the correct item identity may be identified based on the number of items included within the primary group of items. The item analysis system may further determine that an incorrect item identity corresponds to an ABC brand television and a secondary group of items includes the second item based at least in part on the item title 324, the item picture 326, the item title 330, the item picture 332, the item title 336, and the item picture 338. As the secondary group of items includes less items than the primary group of items, the secondary group of items may be identified as corresponding to an incorrect item identity. Based on this determination, the item analysis system may disassociate the second item with the item identifier. In some embodiments, the item analysis system may associate the second item with a new item identifier.

Figure 3C:
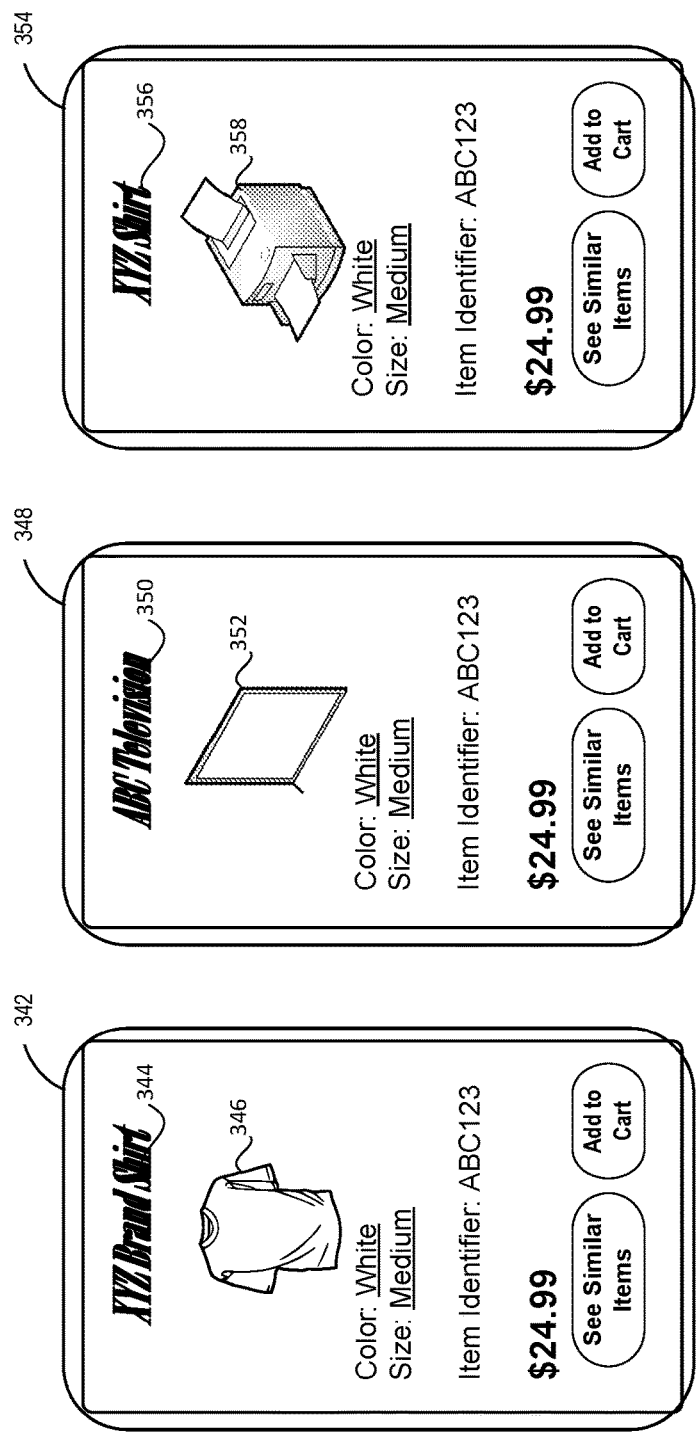
FIG. 3C is a pictorial diagram depicting user interfaces identifying items that share an item identifier.

Whereas FIG. 3A and FIG. 3B illustrate a subset of items that are associated with a correct item identity, FIG. 3C illustrates a plurality of items that are each associated with incorrect item identities. FIG. 3C depicts a series of example user interfaces 342, 348, and 354 presented on a mobile device (e.g., a user computing device) in order to display particular items for browsing and preview by a customer. The example user interfaces 342, 348, and 354 are illustrative of an interface that the retail server generates and presents to a customer when interacting with the retail server. The example user interfaces 342, 348, and 354 illustrate items that are associated with the same item identifier.

The example user interface 342 illustrates a first item that includes an item title 344 and an item picture 346 associated with an item identifier. The example user interface 348 illustrates a second item that includes an item title 350 and an item picture 352 associated with the same item identifier. For example, the first item, the second item, and the third item are each associated with the item identifier "ABC123." The example user interface 354 illustrates a third item that includes an item title 356 and an item picture 358 associated with the same item identifier. Based on each of the first item, the second item, and the third item being associated with the same item identifier, particular item details can be associated with each of the first item, the second item, and the third item and displayed with the items via the user interfaces. For example, each of the first item, the second item, and the third item are displayed with the same color options, the same size options, and the same price. Further, though not shown in FIG. 3C, each of the first item, the second item, and the third item may be displayed with the same ratings, the same reviews, the same instructional (e.g., how-to videos), and/or any other base item information. Therefore, as item details may be shared between the first item, the second item, and the third item, it may be crucial to confirm that the first item, the second item, and the third item are correctly associated with the item identifier.

In the example of FIG. 3C, one or more of the first item, the second item, or the third item is not correctly associated with the item identifier. In order to determine which items are correctly associated with the item identifier and which items are incorrectly associated with the item identifier, the item analysis system may determine a primary group of items and/or secondary groups of items. In the example of FIG. 3C, the first item includes an item title 344 "XYZ Brand Shirt" and an item picture 346 illustrating a shirt, the second item includes an item title 350 "ABC Television" and an item picture 352 illustrating a television, and the third item includes an item title 356 "XYZ Shirt" and an item picture 358 illustrating a scanner. The item analysis system may determine that the item identity corresponds to a lawn mower and the primary group of items does not include the first item, the second item, or the third item. Further, the correct item identity may be identified based on the number of items included within the primary group of items (not shown in FIG. 3C). The item analysis system may further determine that an incorrect item identity corresponds to a scanner, an XYZ Brand shirt, and ABC brand television and a secondary group of items includes the first item, the second item, and the third item based at least in part on the item title 344, the item picture 346, the item title 350, the item picture 352, the item title 356, and the item picture 358. Based on this determination, the item analysis system may disassociate the first item, the second item, or the third item with the item identifier. In some embodiments, the item analysis system may associate one or more of the first item, the second item, or the third item with a new item identifier. In some embodiments, the item analysis system may determine that a primary group of items includes one or more of the first item, the second item, or the third item based at least in part on the item title 344, the item picture 346, the item title 350, the item picture 352, the item title 356, and the item picture 358

Figure 4:
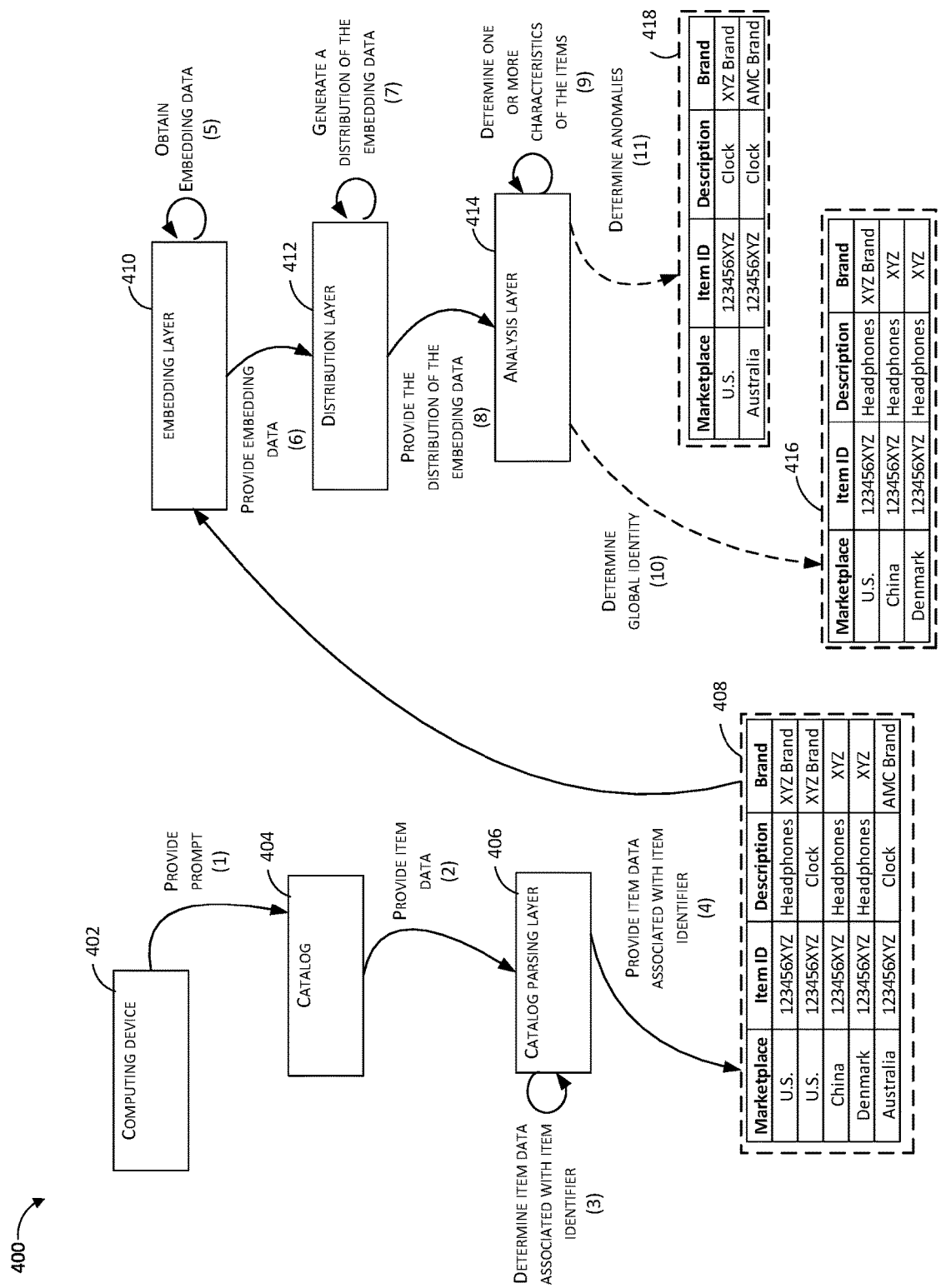
FIG. 4 depicts an example workflow for a natural language processing system analyzing items associated with an item identifier according to some embodiments.

FIG. 4 depicts an example workflow 400 for an item analysis system analyzing item identifiers and items associated with the item identifiers in accordance with aspects of the present disclosure. For example, FIG. 4 illustrates an example workflow for determining which items of the items identified in FIG. 3A, 3B, or 3C are associated with a correct item identifier. Further, FIG. 4 illustrates a workflow for determining a correct or primary item identity for the items identified in FIG. 3A, 3B, or 3C. The item analysis system may run automatically or the item analysis system may be initiated based on a command prompt by a user. In one embodiment, users of the item analysis system may specify an item and/or an item identifier for analysis. For example, users may specify a specific item identifier for analysis by the item analysis system.

As shown in FIG. 4 at (1), the computing device 402 provides a prompt corresponding to a given command, query, or another request. The prompt may be a request from a retailer to associate a particular item identifier with a particular item. For example, the prompt may be an audio prompt, a written prompt, an electronic prompt, etc. Further, the prompt may be a request to verify that a particular item is correctly associated with a particular item identifier. In some embodiments, the item analysis system may not be prompted and may periodically or aperiodically verify a relationship between an item identifier and an item.

At (2), the catalog 404 provides item data based on the prompt to the catalog parsing layer 406. The catalog 404 may provide a plurality of item data. Further, the catalog 404 may provide a plurality of item data associated with a plurality of geographies (e.g., geographic regions). For example, the catalog 404 may provide a plurality of item data associated with a plurality of items and a plurality of geographies. The catalog 404 may obtain the item data in order to determine items that are associated with the particular item identifier At (3), the catalog parsing layer 406 determines item data 408 associated with the item identifier in order to identify items that are associated with the same item identifier (e.g., the item identifier identified by the query of the retailer). The item data 408 may include data associated with items in a single geography. In other embodiments, the item data 408 may include data associated with items in a plurality of geographies. The catalog parsing layer 406 may determine the item data 408 based on the prompt (e.g., the prompt identifying an item or an item identifier). For example, the item data 408 may include items associated with the same item identifier. Further, the catalog parsing layer 406 may determine a plurality of items that are associated with the same item identifier. The item identifier may identify a particular item (or a group of items) and provide information about the particular item. The item identifier may correspond to any numerical, alphabetical, alphanumerical, or symbolical string. For example, the item identifier may correspond to the order of generation. Further, the item identifier may identify relationships between items (e.g., two items that share an item identifier may have a particular relationship).

At (4), the catalog parsing layer 406 provides the item data 408 associated with the item identifier. In the embodiment of FIG. 4, the item data 408 includes five items and includes the following item details for each item: "Geography," "Item ID," "Description," and "Brand." It will be understood that the item data 408 may include more, less, or different items and/or more, less, or different item details. In the example of FIG. 4, the first item corresponds to the geography "U.S.," the item identifier "123456XYZ," the description "Headphones," and the brand "XYZ Brand," the second item corresponds to the geography "U.S.," the item identifier "123456XYZ," the description "Clock," and the brand "XYZ Brand," the third item corresponds to the geography "China," the item identifier "123456XYZ," the description "Headphones," and the brand "XYZ," the fourth item corresponds to the geography "Denmark," the item identifier "123456XYZ," the description "Headphones," and the brand "XYZ," and the fifth item corresponds to the geography "Australia," the item identifier "123456XYZ," the description "Clock," and the brand "AMC Brand." The item data 408 may be associated with a plurality of languages. For example, each particular item of the item data 408 may be associated with a different language.

At (5), the embedding layer 410 obtains embedding data based on the item data 408. For each of the items associated with the item data, the embedding layer 410 may obtain or otherwise determine a value (e.g., a vector or matrix of numerical values) representing a given sentence, word, or token associated with the item data of the item. The embedding data may be language-agnostic sentence data. The embedding layer 410 may include a Language Agnostic Sentence Representation ("LASER"), a multilingual Universal Sentence Encoder ("mUSE"), a Language-agnostic bi-directional transformer Sentence Embeddings ("LaBSE"), or any other language-agnostic embedding. The embedding layer 410 may further include architecture (e.g., processing models) for obtaining the embedding data. For example, the embedding layer may include a bidirectional long short-term memory ("BiLSTM") encoder or decoder, a convolutional neural network ("CNN") dual encoder, a transformer dual encoder, or any other architecture. As the catalog can be associated with a plurality of geographies and a plurality of languages, the embedding layer 410 maps the item data into a shared embedding space. Further, the mapping of the item data into a shared embedding space can normalize the format of the item data (e.g., to form embedding data) without the use of language translation At (6), the embedding layer 410 provides the embedding data to the distribution layer 412.

At (7), the distribution layer 412 generates a distribution of the embedding data. The distribution layer 412 can model the embedding data associated with a particular item identifier as a sample from a distribution (e.g., a von Mises-Fisher distribution) by mapping the embedding data into a multi-dimensional hypersphere. The distribution layer 412 can generate the distribution on a multi-dimensional hypersphere within a multi-dimensional embedding space. Further, the distribution layer 412 can generate the distribution on a (p−1) dimensional hypersphere within a p dimensional embedding space. For example, the distribution layer 412 can generate the distribution on a 767-dimensional hypersphere within a 768-dimensional embedding space. The distribution layer 412 may model the catalog (the catalog identifying a plurality of item identifiers) as a meta-distribution of distributions. The distribution may be based on a probability density function. For example, the von Mises-Fisher distribution may be based on the probability density function of Formula 1 as seen below.

$$f_p(x;\mu,\kappa)=C_p(\kappa)\exp(\kappa\mu^T x) \quad \text{Formula 1}$$

In Formula 1, $f_p$ may be the probability density function, x may be the embedding data, $\mu$ may be the mean vector, $\kappa$ may be the concentration parameter, $C_p$ may be the normalization constant, and T and p may be variables. The normalization constant may be based on Formula 2 as seen below.

$$C_p(\kappa) = \frac{\kappa^{p/2-1}}{(2\pi)^{p/2}I_{p/2-1}(\kappa)} \quad \text{Formula 2}$$

In Formula 2, $I_n$ may be a modified Bessel function of order n, $\kappa$ may be the concentration parameter, $C_p$ may be the normalization constant, and T and p may be variables. The modified Bessel function may be based on Formula 3 as seen below.

$$I_\alpha(x) = i^{-\alpha}J_\alpha(ix) = \sum_{m=0}^{\infty}\frac{1}{m!\Gamma(m+\alpha+1)}\left(\frac{x}{2}\right)^{2m+\alpha} \quad \text{Formula 3}$$

In Formula 3, $J_\alpha$ may be a Bessel function of order a, $\Gamma$ may be the gamma function, and m and x may be variables. The gamma function may be based on Formulas 4 and 5 as seen below.

$$\Gamma(z)=\int_0^\infty x^{z-1}e^{-x}dx,\ \Re(z)>0 \quad \text{Formula 4}$$

$$\Gamma(n)=(n-1)! \quad \text{Formula 5}$$

In Formulas 4 and 5, $\Gamma$ may be the gamma function and z, n, and x may be variables. Based on the probability density function, the item analysis system can generate the distribution.

At (8), the distribution layer 412 provides the distribution of the embedding data to the analysis layer 414.

At (9), the analysis layer 414 determines one or more characteristics of the items by applying data analysis to the distribution to group the data. For example, the analysis layer 414 can determine if an item identifier is consistent (e.g., the item identifier is associated with one group of items) or inconsistent (e.g., the item identifier is associated with multiple groups of items), the analysis layer 414 can determine a primary group of items for the item identifier (e.g., a correct item identity, a primary item identity, etc.), the analysis layer 414 can determine a secondary group of items for the item identifier (e.g., an incorrect item identity, a secondary item identity, etc.), or the analysis layer 414 can perform any additional item analysis or item identifier analysis. A mean resultant vector may be based on Formula 6 as seen below.

$$\overline{x} = \frac{1}{N}\sum_{i}^{N} x_i \qquad \text{Formula 6}$$

In Formula 6, $\overline{x}$ may be the mean resultant vector and N and x may be variables. A mean resultant length may be based on Formula 6 as seen below.

$$\overline{R} = \|\overline{x}\| \qquad \text{Formula 7}$$

In Formula 7, $\overline{R}$ may be the mean resultant length and $\overline{x}$ may be the mean resultant vector. A maximum likelihood estimation may be based on Formulas 8, 9, 10, and 11 as seen below.

$$\mu = \overline{x}/\overline{R} \qquad \text{Formula 8}$$

$$\kappa = A_p^{-1}(\overline{R}) \qquad \text{Formula 9}$$

$$A_p(\kappa) = \frac{I_{p/2}(\kappa)}{I_{p/2-1}(\kappa)} \qquad \text{Formula 10}$$

$$\hat{\kappa} = \frac{\overline{R}(p - \overline{R}^2)}{1 - \overline{R}^2} \qquad \text{Formula 11}$$

In Formulas 8, 9, 10, and 11, $\overline{R}$ may be the mean resultant length, $\overline{x}$ may be the mean resultant vector $\mu$ may be the mean vector, $\kappa$ may be the concentration parameter, $\overline{\kappa}$ may be a modified concentration parameter, $I_n$ may be a modified Bessel function of order n, and $A_p$ may be the maximum likelihood estimation. The analysis layer 414 may utilize the concentration parameter and/or the modified concentration parameter to determine if the item identifier is consistent or inconsistent. For example, as the concentration parameter increases, the distribution may be increasingly consistent. Therefore, a larger concentration parameter may indicate a consistent item identifier. The analysis layer 414 may utilize a cosine distance to the mean vector to determine a primary group of items. For example, the analysis layer 414 may determine clusters of groups using a clustering algorithm and determine a cosine distance to each group. The analysis layer 414 may identify the group with the lowest cosine distance as the primary group. The analysis layer 414 may use a Mean Shift algorithm, DBSCAN, a Cosine-Similarity graph or algorithm, or any other clustering algorithm.

In some embodiments, at (10), the analysis layer 414 can determine the global identity 416 (e.g., a correct item identity for the item identifier) by comparing the groups of items. In the example of FIG. 4, the global identity 416 includes the first item, the third item, and the fourth item. For example, the global identity 416 may be based on the group of items including the largest number of items. The first item corresponds to the geography "U.S.," the item identifier "123456XYZ," the description "Headphones," and the brand "XYZ Brand," the third item corresponds to the geography "China," the item identifier 123456XYZ," the description "Headphones," and the brand "XYZ," and the fourth item corresponds to the geography "Denmark," the item identifier "123456XYZ," the description "Headphones," and the brand "XYZ." The analysis layer 414 may provide the global identity 416 to a user. In some embodiments, at (11), the analysis layer 414 can determine the anomalies 418 (e.g., incorrect item identities). In the example of FIG. 4, the anomalies 418 include the second item and the fifth item. In the example of FIG. 4, the second item corresponds to the geography "U.S.," the item identifier "123456XYZ," the description "Clock," and the brand "XYZ Brand" and the fifth item corresponds to the geography "Australia," the item identifier "123456XYZ," the description "Clock," and the brand "AMC Brand." The analysis layer 414 may provide the anomalies 418 to a user or may disassociate the anomalies 418 with the item identifier.

Figure 5A:
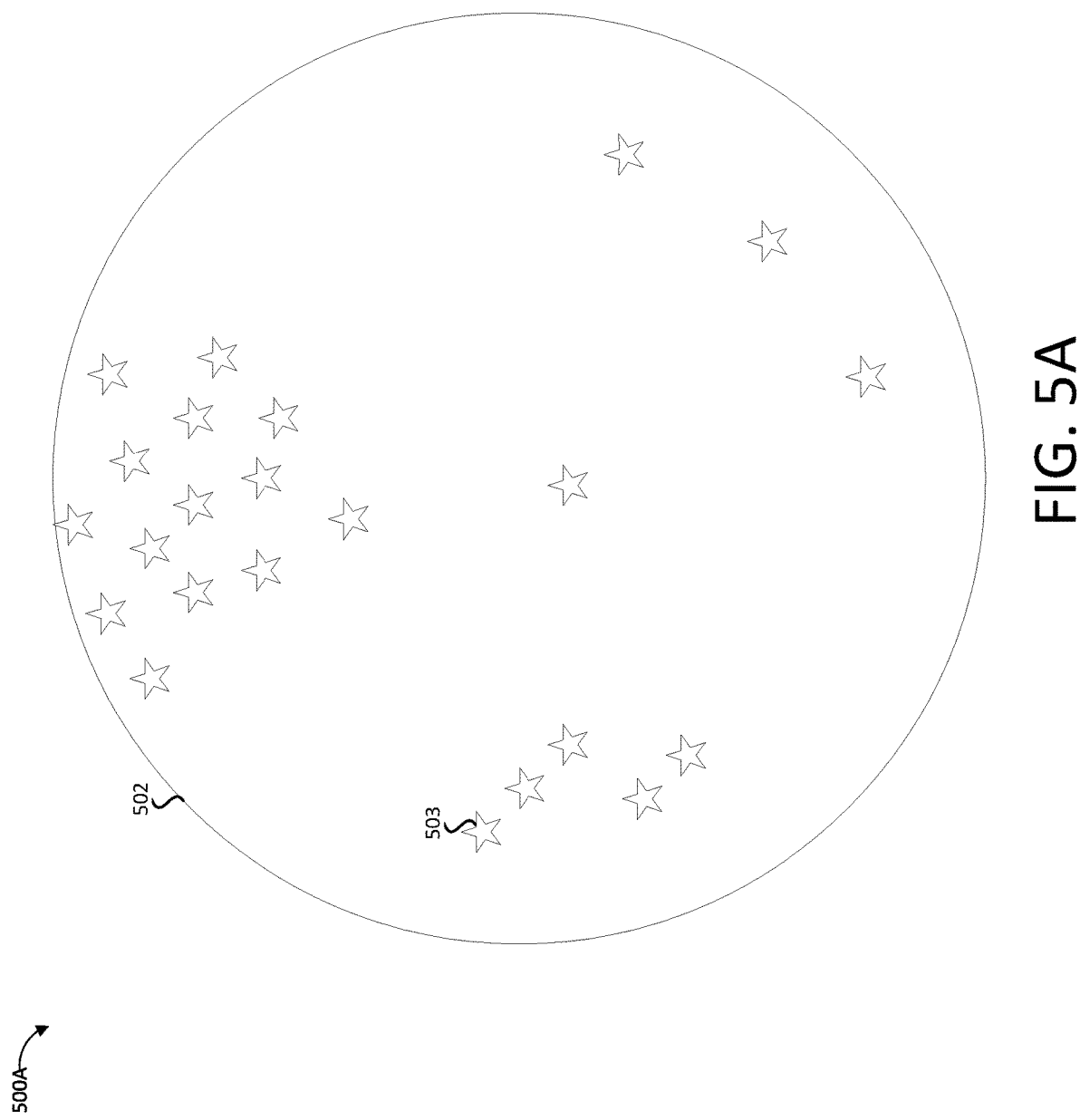
FIG. 5A depicts an example distribution of embedding data for items associated with an item identifier according to some embodiments.

FIG. 5A depicts an example distribution 500A of embedding data for items associated with an item identifier according to some embodiments. The example distribution 500A of embedding data is illustrative of a distribution of embedding data within a space (e.g., a hypersphere 502). The example distribution 500A illustrates embedding data associated with a plurality of items that are associated with the same item identifier. It will be understood that FIG. 5A is illustrative only, and a distribution may illustrate embedding data associated with more, less, or different item identifiers. In some embodiments, the embedding data may be more or less distributed within the space. For example, the embedding data may be concentrated at a single point indicating that the item identifier is consistent. In another example, the embedding data may be distributed throughout the space indicating multiple groups of items and that the item identifier is inconsistent.

The example distribution 500A of embedding data may include a hypersphere 502. The embedding data may be distributed across the hypersphere 502 based at least in part on the embedding. As the item data is embedded using language-agnostic embedding, the item data can be embedded in a consistent manner. Further, item data corresponding to items from different geographies and associated with different languages may be embedded in the same manner without translation (e.g., translation to a common language). The use of language-agnostic embedding may enable the consistent distribution of the embedding data corresponding to the items. The embedding data may be distributed across the hypersphere 502 based on the embedding of the item data. In some embodiments, the embedding data may be distributed across a different construct.

The distribution 500A of the embedding data within the hypersphere 502 may include a plurality of points 503. Each point of the plurality of points 503 may correspond to a particular item associated with an item identifier. In some embodiments, each point of the plurality of points 503 may correspond to the same item identifier. In other embodiments, the plurality of points 503 may correspond to multiple item identifiers. The plurality of points 503 may correspond to one or more geographies. In some embodiments, each point corresponds to a different geography. For example, a first point of the plurality of points 503 may correspond to a first item in a first geography associated with an item identifier and a second point of the plurality of points 503 may correspond to a second item in a second geography associated with the same item identifier. In other embodiments, the plurality of points 503 correspond to the same geography. For example, the plurality of points 503 may correspond to items within the same geography associated with the same item identifier.

Figure 5B:
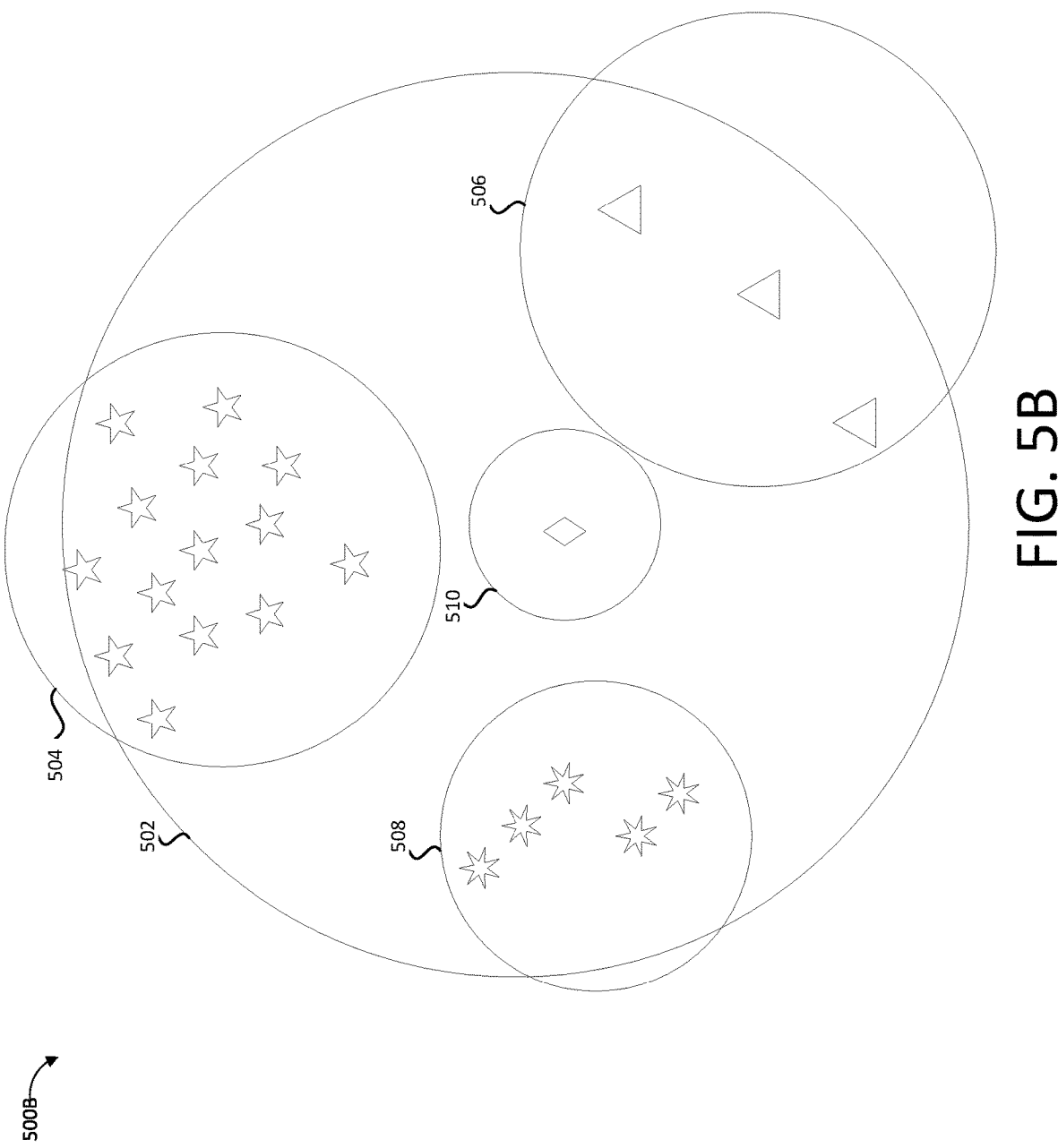
FIG. 5B depicts example groupings of items based on the distribution of embedding data according to some embodiments.

FIG. 5B depicts example groupings 500B of items based on the distribution of embedding data according to some embodiments. The example groupings 500B of items are illustrative of one or more groupings of items within a space (e.g., a hypersphere 502) based on the distribution of embedding data. The example groupings 500B of items illustrates groupings of items that are associated with the same item identifier. It will be understood that FIG. 5B is illustrative only, and one or more groupings may be associated with more, less, or different item identifiers. In some embodiments, the example groupings 500B may include more or less groupings. For example, the example groupings 500B may include one grouping (e.g., the item may be associated with a consistent item identifier).

The example groupings 500B includes a first group of items 504, a second group of items 506, a third group of items 508, and a fourth group of items 510. In order to identify the example groupings 500B, the item analysis system may model the catalog as a meta-distribution of von Mises-Fisher distributions and each of the von Mises-Fisher distributions may be associated with a particular item identifier of the plurality of item identifiers. Based on the meta-distribution of von Mises-Fisher distributions, the item analysis system can determine a typical (e.g., common, average, normal, etc.) size of a group of items. Based on the determined typical size of a group of items the item analysis system can identify the example groupings 500B based on the distribution of the embedding data. In some embodiments, the first group of items 504 may be identified as the primary group of items and the second group of items 506, the third group of items 508, and the fourth group of item 510 may be identified as the secondary group of items. The designation or identification of the primary group of items and/or the secondary group of items may be based on the number or quantity of items in each group. For example, the first group of items 504 has the most items of the groups and may be designated as the primary group of items. The embedding data for the items may be grouped based on a clustering algorithm. For example, the clustering algorithm may be a Mean Shift algorithm. Kernel density estimation may be applied to the distribution of the embedding data to estimate the probability density function of the embedding data. The kernel density estimation may generate a plurality of kernels. Each kernel may be centered on a point of the plurality of points. For example, the kernel may be a von Mises-Fisher kernel. The Mean Shift algorithm may be applied to the plurality of kernels to identify modes (e.g., clusters or groups) of items using kernel density estimation iso-density lines. The Mean Shift algorithm may be an equality-constrained optimization. For example, one or more variables (e.g., norm) may be set equal to a particular value (e.g., 1). Further, the Mean Shift algorithm may be solved using a Lagrange multiplier. In another example, the clustering algorithm may be DBSCAN. DBSCAN may be used to identify clusters of points based on the cosine distance between points. A point may be classified as a core point for a cluster if at least n points are within cosine distance x of the point where n and x may be any number. The core point and any points within cosine distance x of the point may form a cluster of points. Each noise point (e.g., outlier) may be classified or assigned to an individual cluster. In another example, the clustering algorithm may be a Cosine-Similarity algorithm. The Cosine-Similarity algorithm may determine the similarity between multiple points based on the dot product of the points divided by the product of the magnitude of the points. Points may be identified as similar (e.g., forming a cluster) if the similarity is equal to or greater than x where x can be any number. It will be understood that any clustering algorithm may be used to cluster the plurality of points.

Figure 6A:
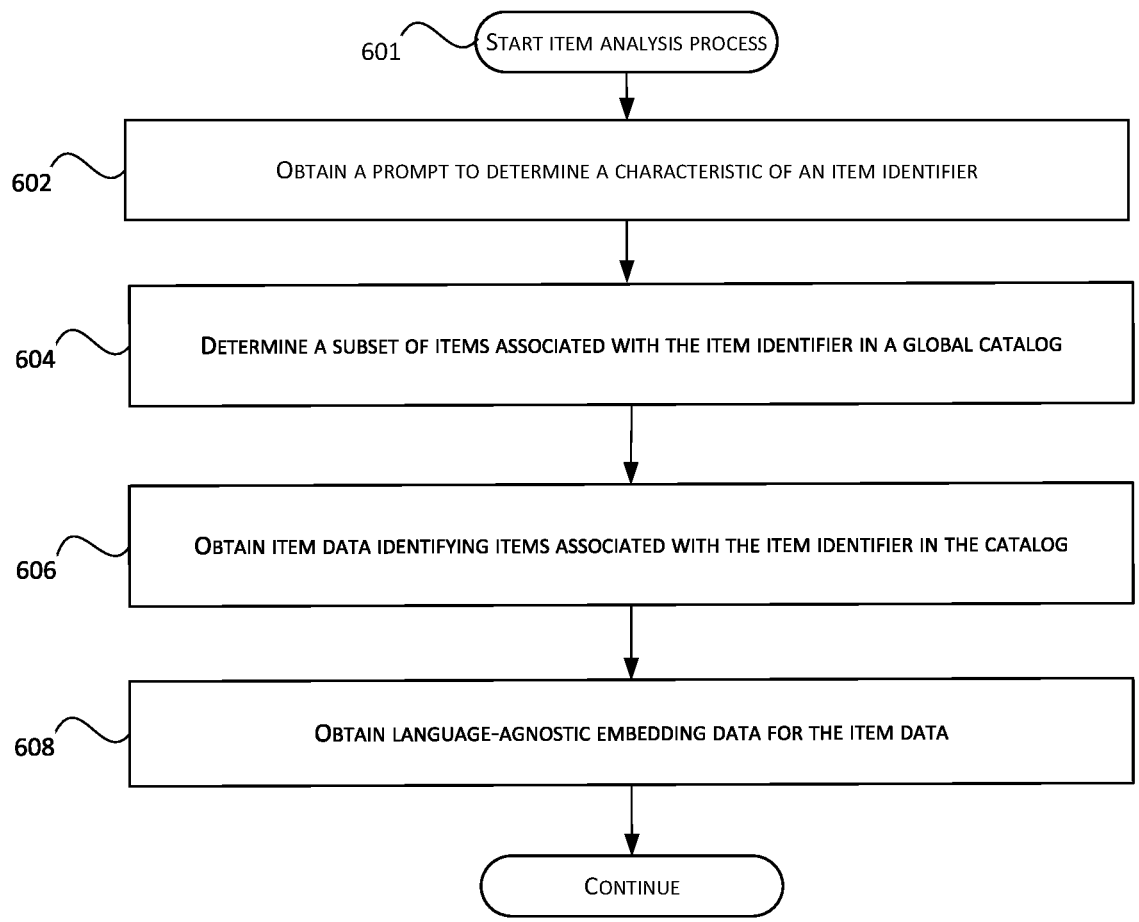
FIG. 6A is a flowchart of an example routine for implementing a natural language processing system using language-agnostic embedding input according to some embodiments.

FIG. 6A describes an illustrative process 600A for receiving item data identifying items and obtaining embedding data for the item data. The process 600A includes determining items associated with the item identifier and obtaining embedding data for the items. By using such embedding data, the item analysis system can avoid translating the item data in order to compare items across a plurality of geographies.

The process 600A begins at block 601. The process 600A begins automatically upon obtaining a prompt from a retailer computing device requesting that an item be associated with a particular item identifier or a consumer computing device requesting that the association of an item identifier with an item be verified. In some embodiments, the process 600A may begin periodically or aperiodically to monitor and/or verify the status of item identifiers in a catalog (e.g., a metadata catalog, a meta catalog, a global catalog, etc.). For example, the process 600A initiates automatically to monitor the catalog and verify that each item identifier is a consistent item identifier. The process 600A may be embodied in a set of executable program instructions stored on a computer-readable medium, such as one or more disk drives, of a computing system of the retail server. When the process 600A is initiated, the executable program instructions can be loaded into memory, such as RAM, as executed by one or more processors of the computing system.

At block 602, the item analysis system obtains a prompt to determine a characteristic of an item identifier. The prompt may include a request to associate an item with an item identifier in a catalog or to verify the association of the item with the item identifier. The catalog may identify a plurality of items (e.g., products). The catalog may obtain item data in order to determine items that are associated with the particular item identifier.

At block 604, the item analysis system determines a subset of items associated with the item identifier in the catalog in order to determine items that are related or associated with the item identifier identified by the prompt. The subset of items may be associated with a plurality of geographies. Further, the subset of items may be associated with a plurality of languages.

At block 606, the item analysis system obtains item data identifying items associated with the item identifier in the catalog in order to identify items that are associated with the same item identifier (the item identifier identified in the prompt). The item analysis system may obtain item data corresponding to a plurality of items across a plurality of geographies associated with the same item identifier. The item data may identify related items. The related items may include consistent related items and/or inconsistent related items.

In order to map the item data into the same embedding space and normalize the item data, at block 608, the item analysis system obtains language-agnostic embedding data for the item data. As the catalog can be associated with a plurality of geographies and a plurality of languages, the embedding maps the item data into a shared embedding space. Further, the mapping of the item data into a shared embedding space can normalize the format of the item data (e.g., to form embedding data) without the use of language translation. The language-agnostic embedding data may include a plurality of embedding output vectors for the subset of the items. The plurality of embedding output vectors may represent features associated with the subset of the items.

Figure 6B:
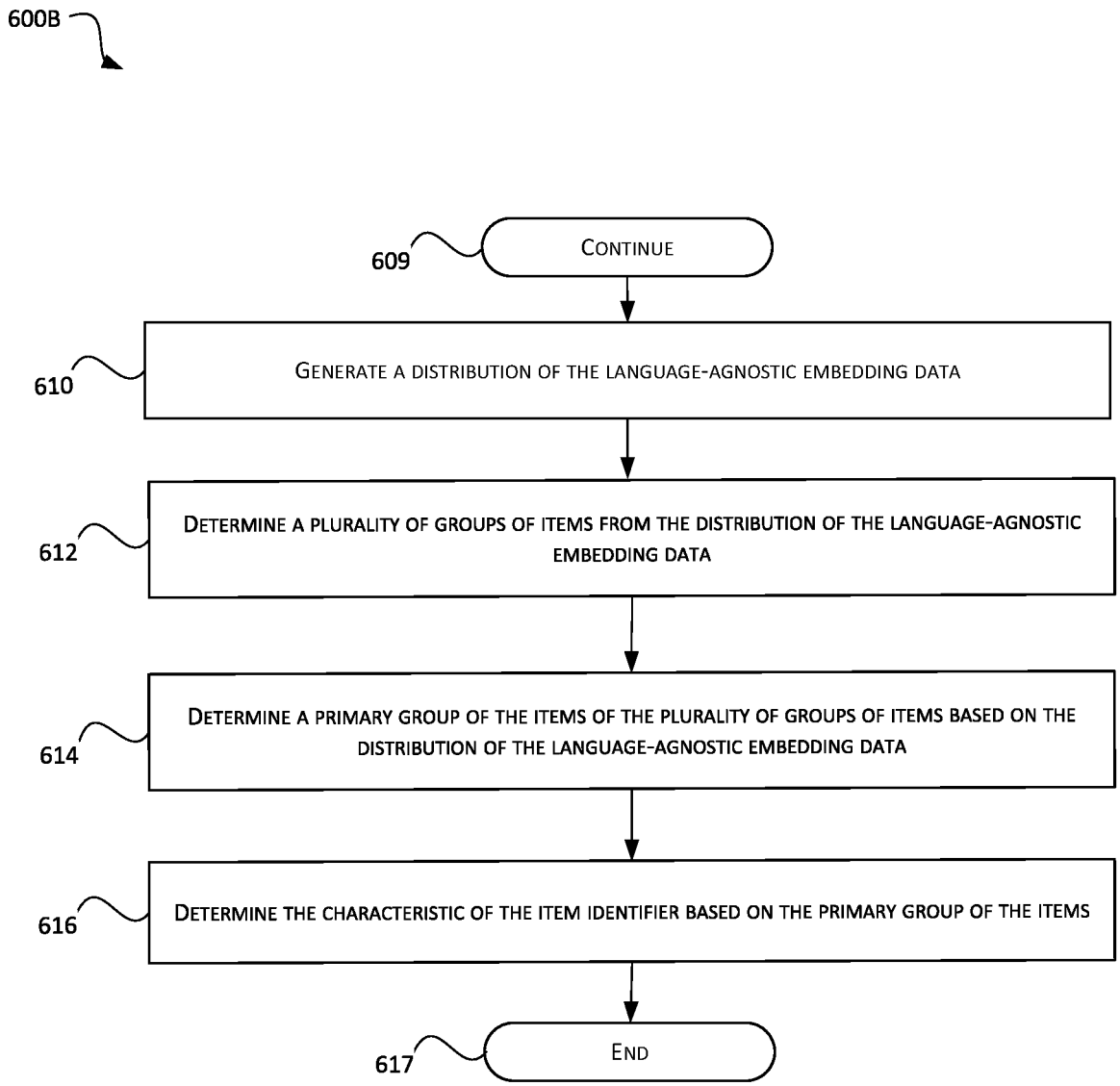
FIG. 6B is a flowchart of an example routine for implementing a natural language processing system using language-agnostic embedding input according to some embodiments.

FIG. 6B describes an illustrative process 600B for generating a distribution of the embedding data and determining a characteristic of the item identifier based on the distribution. FIG. 6B represents a continuation of the illustrative process 600A of FIG. 6A. The process 600B begins at block 609. The process 600B may begin automatically upon obtaining the embedding data for the item data. The process 600B may be embodied in a set of executable program instructions stored on a computer-readable medium, such as one or more disk drives, of a computing system of the retail server. When the process 600B is initiated, the executable program instructions can be loaded into memory, such as RAM, as executed by one or more processors of the computing system.

At block 610, the item analysis system generates a distribution of the language-agnostic embedding data, the distribution of the language-agnostic embedding data. In some embodiments, the distribution of the language-agnostic s embedding data may include a plurality of independent identically distributed samples. Further, each independent identically distributed sample may be associated with a particular geography of the plurality of geographies. In some embodiments, the distribution may be a von Mises-Fisher distribution. In some embodiments, the catalog may be associated with a plurality of item identifiers. Further, generating the distribution may include modeling the catalog as a meta-distribution of von Mises-Fisher distributions and each of the von Mises-Fisher distributions may be associated with a particular item identifier of the plurality of item identifiers. Based on the distribution of the language-agnostic embedding data, the item analysis system can determine whether the item identifier is a consistent item identifier or an inconsistent item identifier. The item analysis system can determine whether the item identifier is a consistent item identifier or an inconsistent item identifier without or prior to determining the plurality of groups of items from the distribution.

At block 612, the item analysis system determines a plurality of groups (e.g., clusters) of items from the distribution of the language-agnostic embedding data. By determining the distribution of the embedding data, the item analysis system can identify groups of items in order to determine an item identity for the item identifier and a primary group of items that are associated with the item identity (e.g., items that are correctly associated with the item identifier). Further, by determining groups of items, the item analysis system can identify false item identities that are incorrectly associated with the item identifier and secondary groups of items that are associated with the false item identities (e.g., items that are incorrectly associated with the item identifier). Each item of a particular group of the plurality of groups of the items may share particular item characteristics. For instances, shirts may be in one group of items and televisions may be in another group of items. The delineation between groups of items may be based on the distribution of items. The item analysis system may determine the plurality of groups utilizing data analysis applied to the distribution. In some embodiments, the data analysis may be a Cosine-Similarity algorithm. In other embodiments, the data analysis may be DBSCAN. In other embodiments, the data analysis may be a Mean Shift algorithm. The item analysis system may model the distribution with kernel density estimation and determine a mode (e.g., group) of the kernel density estimation from the Mean Shift algorithm. In some embodiments, the item analysis system may not determine a plurality of groups of items from the distribution.

At block 614, the item analysis system determines a primary group of the items of the plurality of groups of items based on the distribution of the language-agnostic embedding data. The primary group of the items may identify a correct item identity associated with the item identifier. Further, each item of the primary group of the items may share the correct item identity be consistent with the item identifier. Therefore, the primary group of the items may identify consistent, related items. The determination of the primary group of the items may be based at least in part on the number or quantity of items in each group of the plurality of groups. For example, the group associated with the most items of the plurality of groups may be identified as the primary group of the items.

At block 616, the item analysis system determines a characteristic of the item identifier based on the primary group of the items. Determining the characteristic of the item identifier may include one or more of determining a status of the item identifier, identifying the primary group, or determining secondary groups of the items. The item identifier may be associated with a singular group of items or item identity (e.g., the item identifier is a consistent item identifier where all items associated with the item identifier are associated with the same item identity) or multiple groups of items or item identities (e.g., the item identifier is an inconsistent item identifier where items associated with the item identifier are associated with multiple item identities). Each item may be consistent with the consistent item identifier and at least one item may be inconsistent with the inconsistent item identifier. The item analysis system may determine that an item corresponds to the primary group of the items. Each item of the secondary groups of items may be inconsistent with the item identifier. Further, the secondary group of items may include inconsistent related items. In response to the determination of the characteristic, the item analysis system can associate the first item with the item identifier in the catalog based on determining that the first item is associated with the primary group of items. The item analysis system may further determine that another item does not correspond to the primary group of the items (e.g., corresponds to a secondary group of items) and in response to this determination, the item analysis system may deny a request to associate the item with the item identifier in the catalog and/or disassociate the item with the item identifier in the catalog. The process 600B may end at block 617.

Figure 7:
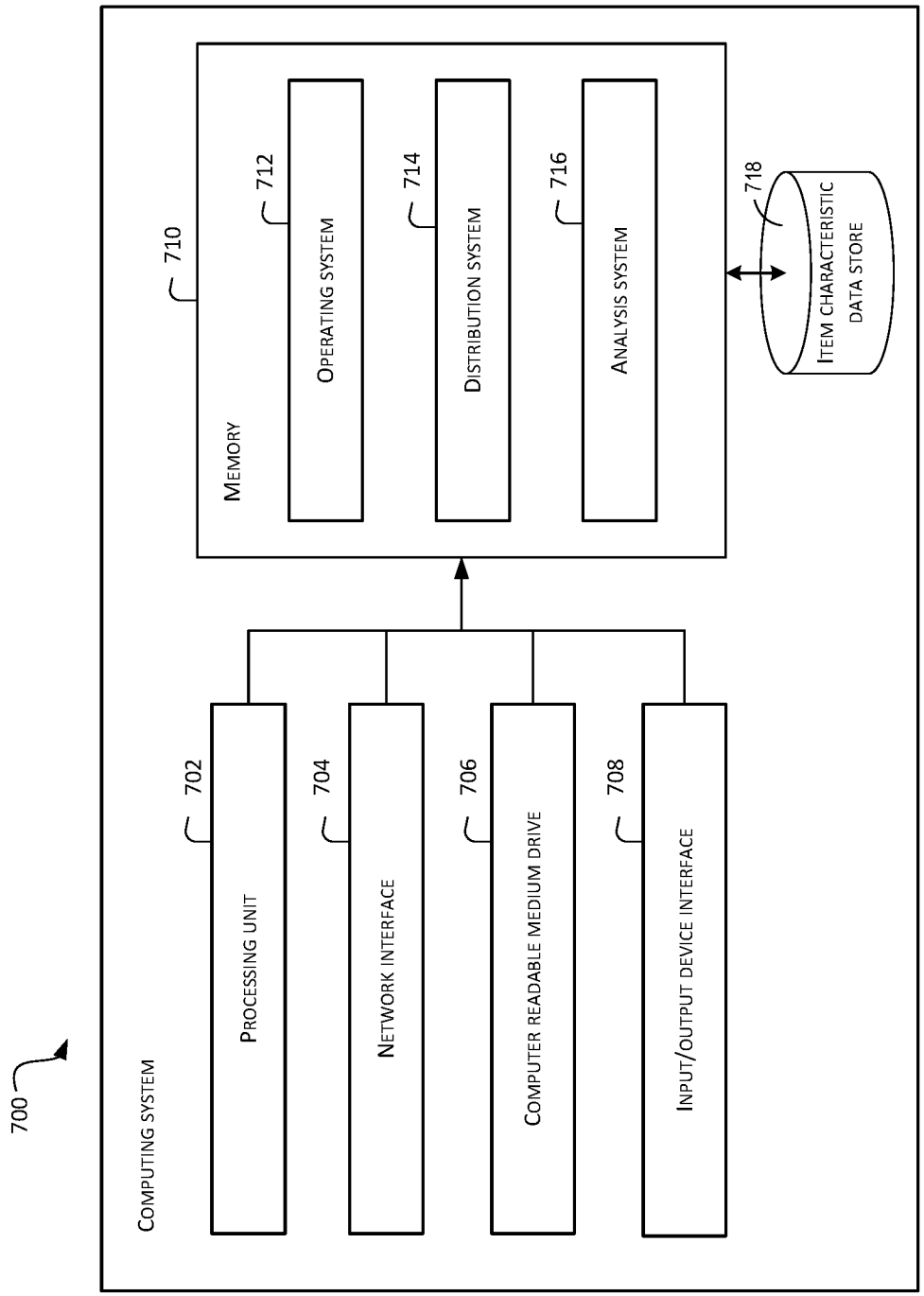
FIG. 7 shows an example computing device that may be used to implement aspects of the present disclosure.

FIG. 7 illustrates an example computing system 700 configured to execute the processes and implement the features described above. In some embodiments, the computing system 700 may include: one or more computer processors 702, such as physical central processing units ("CPUs"); one or more network interfaces 704, such as a network interface cards ("NICs"); one or more computer readable medium drives 706, such as a high density disk ("HDDs"), solid state drives ("SDDs"), flash drives, and/or other persistent non-transitory computer-readable media; an input/output device interface 708, such as an IO interface in communication with one or more microphones; and one or more computer readable memories 710, such as random access memory ("RAM") and/or other volatile non-transitory computer-readable media.

The network interface 704 can provide connectivity to one or more networks or computing systems. The computer processor 702 can receive information and instructions from other computing systems or services via the network interface 704. The network interface 704 can also store data directly to the computer-readable memory 710. The computer processor 702 can communicate to and from the computer-readable memory 710, execute instructions and process data in the computer readable memory 710, etc.

The computer readable memory 710 may include computer program instructions that the computer processor 702 executes in order to implement one or more embodiments. The computer readable memory 710 can store an operating system 712 that provides computer program instructions for use by the computer processor 702 in the general administration and operation of the computing system 700. The computer readable memory 710 can further include computer program instructions and other information for implementing aspects of the present disclosure. For example, in one embodiment, the computer readable memory 710 may include a distribution system 714. As another example, the computer-readable memory 710 may include an analysis system 716. The computer-readable may be in communication with an item characteristic data store 718. In some embodiments, multiple computing systems 700 may communicate with each other via their respective network interfaces 704, and can implement item analysis separately (e.g., each computing system 700 may execute one or more separate instances of the process 600A and/or 600B), in parallel (e.g., each computing system 700 may execute a portion of a single instance of a process 600A and/or 600B), etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a computer-readable memory storing executable instructions; and
a processor in communication with the computer-readable memory and configured by the executable instructions to at least:
obtain a request to associate a first item with an item identifier in a global catalog, the global catalog identifying items and a plurality of sets of features;
determine a subset of the items associated with the item identifier in the global catalog, wherein the subset of the items are associated with a plurality of languages;
obtain item data corresponding to the subset of the items from the global catalog;
obtain a plurality of embedding output vectors for the subset of the items based at least in part on the item data, wherein the plurality of embedding output vectors represent features associated with the subset of the items;
generate a distribution of the plurality of embedding output vectors;
determine a plurality of clusters of items from the distribution of the plurality of embedding output vectors, wherein each cluster of the plurality of clusters of items comprises one or more items that are associated with the item identifier and share a respective set of features of the plurality of sets of features;
identify a primary cluster of items from the plurality of clusters of items, the primary cluster identifying a set of verified items consistent with the item identifier;
disassociate a secondary cluster of items of the plurality of clusters of items with the item identifier in the global catalog based at least in part on the distribution of the plurality of embedding output vectors;
determine that the first item corresponds to the primary cluster;
in response to determining that the first item corresponds to the primary cluster, associate the first item with the item identifier in the global catalog;
determine that a second item does not correspond to the primary cluster; and
in response to determining that the second item does not correspond to the primary cluster, deny a request to associate the second item with the item identifier in the global catalog.

2. The system of claim 1, wherein the processor is configured by further executable instructions to at least:
obtain the request to associate the second item with the item identifier in the global catalog.

3. The system of claim 1, wherein the global catalog is associated with a plurality of geographies, wherein the distribution of the plurality of embedding output vectors comprises a plurality of independent identically distributed samples, and wherein each independent identically distributed sample of the plurality of independent identically distributed samples is associated with a particular geography of the plurality of geographies.

4. The system of claim 1, wherein the distribution of the plurality of embedding output vectors comprises a von Mises-Fisher distribution.

5. A computer-implemented method for analyzing item data of a metadata catalog, the computer-implemented method comprising:
under control of a computing system comprising a processor configured to execute specific instructions,
obtaining first item data from a metadata catalog, the first item data identifying items associated with an item identifier and a plurality of sets of item characteristics;
obtaining first embedding data for the items based at least in part on the first item data, wherein the first embedding data comprises language-agnostic embedding data;
generating a distribution of the first embedding data, wherein the distribution of the first embedding data comprises a plurality of groups of the items, wherein each group of the plurality of groups of the items comprises one or more of the items that are associated with the item identifier and share a respective set of item characteristics of the plurality of sets of items characteristics;
determining a primary group of the items of the plurality of groups of the items based at least in part on the distribution of the first embedding data;
disassociating a secondary group of the items of the plurality of groups of the items and the item identifier based at least in part on the distribution of the first embedding data;
determining a characteristic of the item identifier based at least in part on a set of item characteristics, of the plurality of sets of item characteristics, associated with the primary group of the items;
determine that a first item does not correspond to the primary group of the items; and
in response to determining that the first item does not correspond to the primary group of the items, deny a request to associate the first item with the item identifier.

6. The computer-implemented method of claim 5, further comprising:
obtaining a request to associate a second item with the item identifier in the metadata catalog;
obtaining second item data associated with the second item; and
obtaining second embedding data for the second item based at least in part on the second item data, wherein the distribution of the first embedding data comprises a distribution of the first embedding data and the second embedding data,
wherein determining the characteristic of the item identifier comprises determining the second item is consistent with the item identifier.

7. The computer-implemented method of claim 6, wherein determining the second item is consistent with the item identifier comprises determining that the second item corresponds to the primary group of the items.

8. The computer-implemented method of claim 5, wherein determining the characteristic of the item identifier comprises determining a status of the item identifier, wherein the item identifier comprises at least one of:
- a consistent item identifier, wherein each item in the primary group of the items is consistent with the consistent item identifier, or
- an inconsistent item identifier, wherein at least one item in the primary group of the items or an additional secondary group of the items of the plurality of groups of the items is inconsistent with the inconsistent item identifier.

9. The computer-implemented method of claim 5, wherein each item in the primary group of the items is consistent with the item identifier.

10. The computer-implemented method of claim 5, wherein each item of the primary group of the items is consistent with the item identifier and each item of the secondary group of the items is inconsistent with the item identifier.

11. The computer-implemented method of claim 5, wherein the metadata catalog is associated with a plurality of item identifiers, wherein generating the distribution of the first embedding data comprises modeling the metadata catalog as a meta-distribution of von Mises-Fisher distributions, and wherein each of the von Mises-Fisher distributions corresponds to a particular item identifier of the plurality of item identifiers.

12. The computer-implemented method of claim 5, wherein the metadata catalog is associated with a plurality of geographies, wherein the distribution of the first embedding data comprises a plurality of independent identically distributed samples, and wherein each independent identically distributed sample of the plurality of independent identically distributed samples is associated with a particular geography of the plurality of geographies.

13. The computer-implemented method of claim 5, further comprising determining the plurality of groups of the items from a data clustering algorithm applied to the distribution of the first embedding data.

14. The computer-implemented method of claim 5, further comprising:
- modeling the distribution of the first embedding data with a kernel density estimation; and
- determining a mode of the kernel density estimation from a Mean Shift algorithm applied to the distribution of the first embedding data.

15. The computer-implemented method of claim 5, further comprising determining the plurality of groups of the items from a Cosine-Similarity algorithm applied to the distribution of the first embedding data.

16. The computer-implemented method of claim 5, further comprising determining the plurality of groups of the items based at least in part on density-based spatial clustering of applications with noise to identify a first plurality of items for the primary group of the items.

17. The computer-implemented method of claim 5, further comprising:
- obtaining a request to associate a second item with the item identifier in the metadata catalog;
- identifying a relationship between the second item and the item identifier based at least in part on the characteristic of the item identifier;
- determining a response to the request to associate the second item with the item identifier based at least in part on the relationship between the second item and the item identifier; and
- causing display of a user interface, wherein the user interface identifies the response to the request to associate the second item with the item identifier, wherein the response comprises:
  - a recommendation to associate the second item with a new item identifier,
  - a recommendation to associate the second item with a current item identifier,
  - a rejection of the request to associate the second item with the item identifier,
  - an acceptance of the request to associate the second item with the item identifier, or
  - a request to provide an updated item identifier for the second item.

18. A system comprising:
- a computer-readable memory storing executable instructions; and
- a processor in communication with the computer-readable memory and configured by the executable instructions to at least:
  - obtain item data from a metadata catalog, the item data identifying related items and a plurality of sets of item characteristics;
  - obtain language-agnostic embedding data for the related items based at least in part on the item data;
  - generate a distribution of the language-agnostic embedding data, wherein the distribution of the language-agnostic embedding data comprises a plurality of groups of the related items, wherein each group of the plurality of groups of the related items comprises one or more of the related items that share a respective set of item characteristics of the plurality of sets of item characteristics;
  - identify a primary group of the related items of the plurality of groups of the related items based at least in part on the distribution of the language-agnostic embedding data;
  - disassociate a secondary group of the related items of the plurality of groups of the related items from other related items of the plurality of groups of the related items based at least in part on the distribution of the language-agnostic embedding data;
  - determine a characteristic of the related items based at least in part on a set of item characteristics, of the plurality of sets of item characteristics, associated with the primary group of the related items;
  - determine that a first item does not correspond to the primary group of the related items; and
  - in response to determining that the first item does not correspond to the primary group of the related items, deny a request to relate the first item to the related items.

19. The system of claim 18, wherein the related items comprise at least one of:
- consistent related items, wherein each item of the related items is consistent with the primary group of the related items based at least in part on disassociating the secondary group of the related items of the plurality of groups of the related items from other related items of the plurality of groups of the related items, or
- inconsistent related items, wherein at least one item of the related items is inconsistent with the primary group of the related items.

20. The system of claim 18, wherein the primary group of the related items comprises at least two consistent, related items.

21. The system of claim 18, wherein the primary group of the related items comprises consistent related items and the secondary group of the related items comprises inconsistent related items.

* * * * *